United States Patent
Discenzo

(10) Patent No.: US 6,295,510 B1
(45) Date of Patent: Sep. 25, 2001

(54) MODULAR MACHINERY DATA COLLECTION AND ANALYSIS SYSTEM

(75) Inventor: Frederick M. Discenzo, Brecksville, OH (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/118,287

(22) Filed: Jul. 17, 1998

(51) Int. Cl.$^7$ .................................................. H02K 24/00
(52) U.S. Cl. .............................................. 702/183; 310/50
(58) Field of Search ..................... 702/183, 182, 702/81, 82, 56, 57; 310/10, 50, 53; 324/500, 512, 513, 520, 522, 772; 340/870.16, 825.06, 825.16, 825.56

(56) References Cited

U.S. PATENT DOCUMENTS

| | | |
|---|---|---|
| 4,063,112 | 12/1977 | Dumbeck . |
| 4,194,178 | 3/1980 | Dumbeck . |
| 4,694,187 * | 9/1987 | Baker ........................................ 290/4 |
| 4,965,513 | 10/1990 | Haynes et al. . |
| 5,049,815 | 9/1991 | Kliman . |
| 5,313,407 | 5/1994 | Tiernan et al. . |
| 5,416,399 | 5/1995 | Brunson . |
| 5,419,197 | 5/1995 | Ogi et al. . |
| 5,468,948 * | 11/1995 | Koenk et al. .......................... 235/472 |
| 5,481,481 * | 1/1996 | Frey et al. .............................. 702/82 |
| 5,485,491 * | 1/1996 | Salnick et al. ........................ 376/245 |
| 5,508,633 | 4/1996 | Rivera . |
| 5,512,883 | 4/1996 | Lane, Jr. . |
| 5,530,343 | 6/1996 | Bowers, III et al. . |
| 5,566,091 * | 10/1996 | Schricker et al. ...................... 702/34 |
| 5,574,387 | 11/1996 | Petsche et al. . |
| 5,576,632 | 11/1996 | Petsche et al. . |
| 5,579,232 | 11/1996 | Tong et al. . |
| 5,602,708 | 2/1997 | Felgenhauer . |
| 5,612,629 | 3/1997 | Mullin et al. . |
| 5,640,103 | 6/1997 | Petsche et al. . |
| 5,726,911 | 3/1998 | Canada et al. . |
| 6,041,287 * | 3/2000 | Dister et al. .......................... 702/182 |

* cited by examiner

*Primary Examiner*—Marc S. Hoff
*Assistant Examiner*—Edward Raymond
(74) *Attorney, Agent, or Firm*—Himanshu S. Amin; Alexander M. Gerasimow; William R. Walbrun

(57) ABSTRACT

A dynamoelectric machine diagnostic system is provided. The system includes a docking station coupled to a dynamoelectric machine; a plurality of sensors operatively coupled to the docking station, at least one of the sensors being permanently positioned in the dynamoelectric machine for data gathering; and a diagnostic module, adapted to be received by and coupled to the docking station so that the diagnostic module may collect data output from at least one of the plurality of sensors.

31 Claims, 15 Drawing Sheets

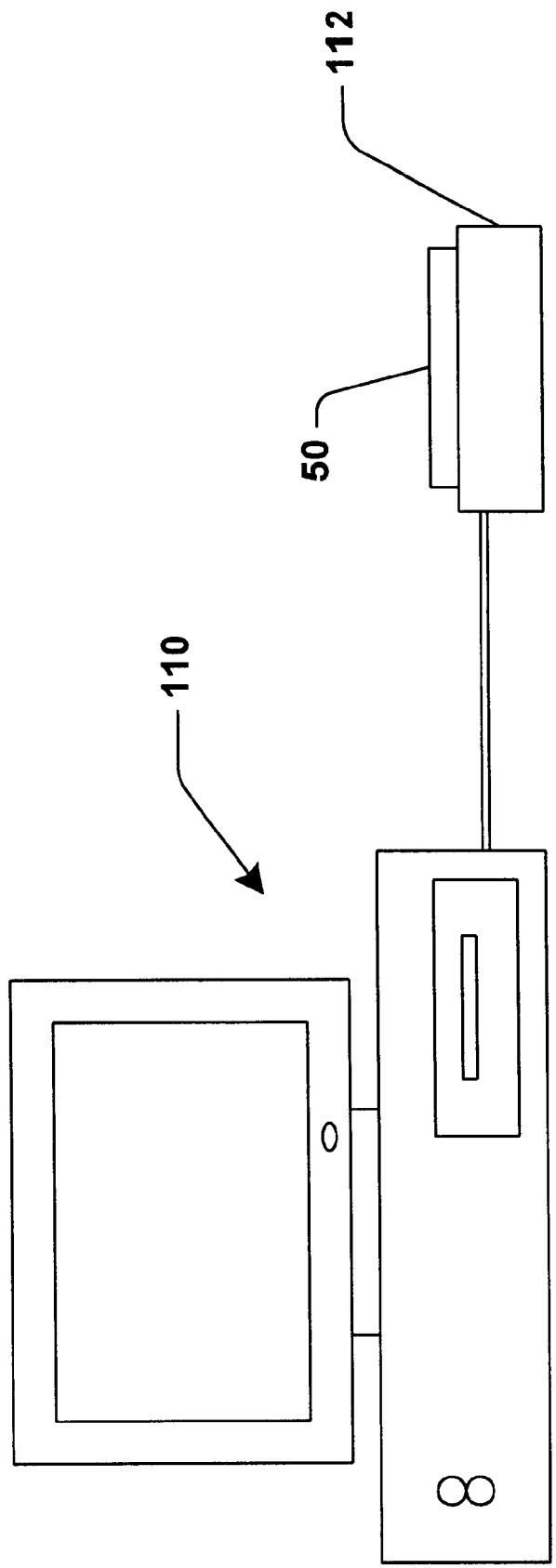

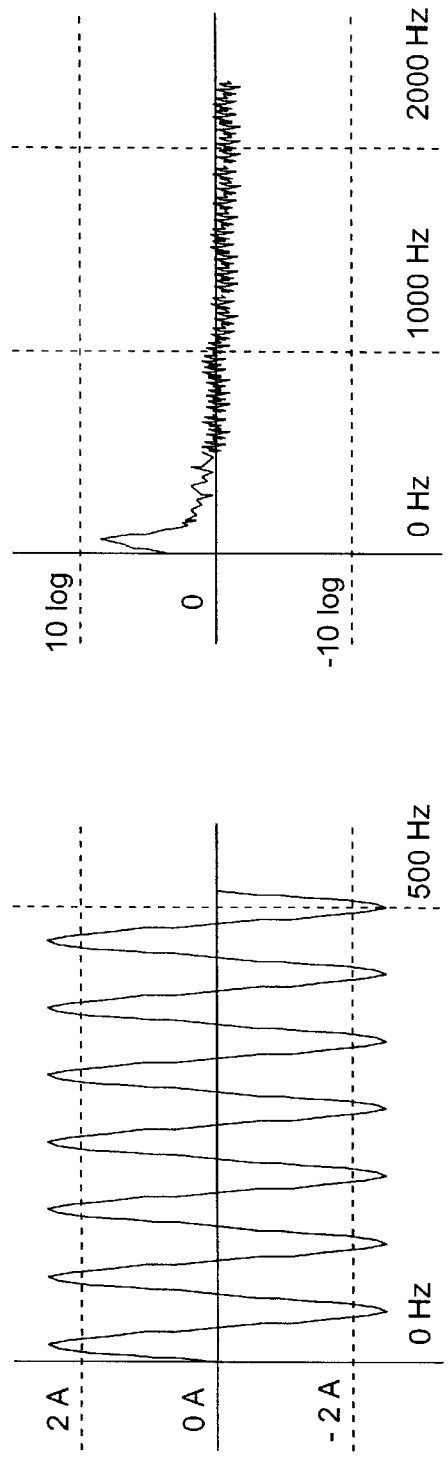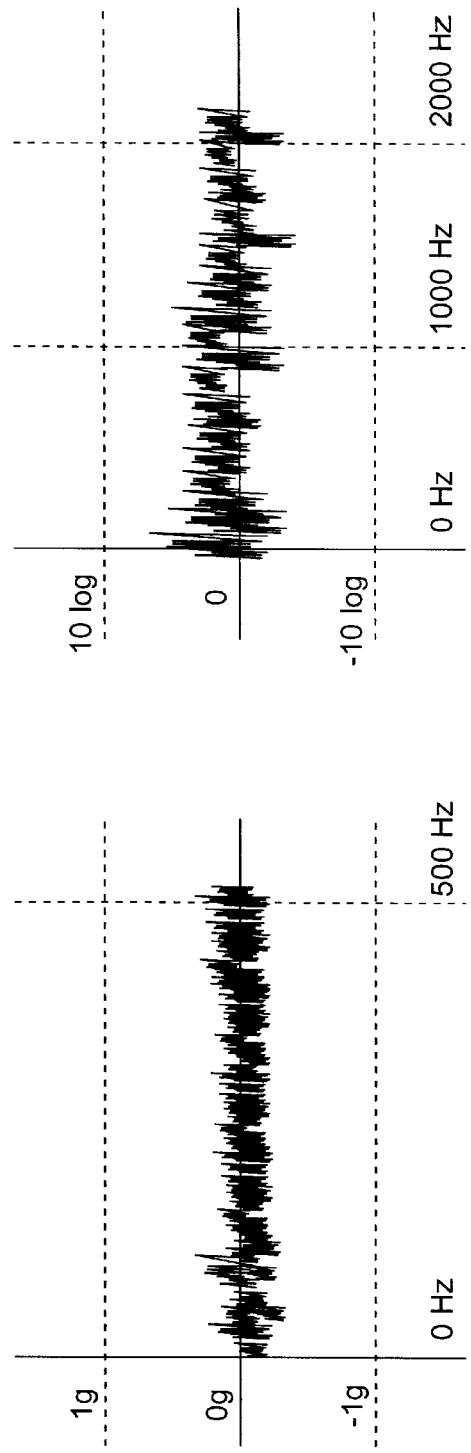

| | $f_0$ | $f_1$ | $f_2$ | $f_3$ | $f_4$ | • | • | • | $f_n$ | |
|---|---|---|---|---|---|---|---|---|---|---|
| | $A_3$ | $A_{34}$ | $A_{67}$ | $A_{78}$ | $A_{84}$ | • | • | • | $A_K$ | HEALTHY MOTOR |
| | $A_{34}$ | $A_{-68}$ | $A_{-90}$ | $A_{-65}$ | $A_{45}$ | • | • | • | $A_H$ | HEALTHY MOTOR |
| | $A_{56}$ | $A_{45}$ | $A_{45}$ | $A_{56}$ | $A_{78}$ | • | • | • | $A_X$ | BAD BEARING |
| | $A_{-23}$ | $A_{45}$ | $A_7$ | $A_{90}$ | $A_{12}$ | • | • | • | $A_Z$ | CRACKED ROTOR |
| | $A_{67}$ | $A_{36}$ | $A_3$ | $A_{45}$ | $A_{47}$ | • | • | • | $A_X$ | INSULATION PROBLEM |
| | $A_{78}$ | $A_{67}$ | $A_{12}$ | $A_{67}$ | $A_{37}$ | • | • | • | $A_C$ | HEALTHY MOTOR |
| | $A_{234}$ | $A_{27}$ | $A_{478}$ | $A_{24}$ | $A_{127}$ | • | • | • | $A_Q$ | BAD BEARING |
| | $A_{-98}$ | $A_{78}$ | $A_{26}$ | $A_{12}$ | $A_{128}$ | • | • | • | $A_B$ | CRACKED CASING |
| | $A_{26}$ | $A_{96}$ | $A_{83}$ | $A_{56}$ | $A_{234}$ | • | • | • | $A_M$ | LUBRICATION PROBLEM |
| | $A_4$ | $A_{32}$ | $A_{187}$ | $A_{56}$ | $A_{34}$ | • | • | • | $A_I$ | BAD INNER RACE |
| | $A_0$ | $A_{16}$ | $A_{73}$ | $A_{76}$ | $A_{33}$ | • | • | • | $A_E$ | BAD OUTER RACE |
| | $A_{75}$ | $A_{17}$ | $A_{45}$ | $A_{69}$ | $A_{44}$ | • | • | • | $A_Q$ | BAD BALL SURFACE |

Fig. 7

MODULAR MACHINERY DATA COLLECTION AND ANALYSIS SYSTEM

TECHNICAL FIELD

The present invention generally relates to a data collection module for collecting data to facilitate diagnostics and failure prevention of rotating machinery.

BACKGROUND OF THE INVENTION

Electric machines such as motors and generators are widely employed in industrial and commercial facilities. These machines are relied upon to operate with minimum attention and to provide long and reliable operation. Many facilities operate several hundreds or even thousands of such machines concurrently, many of which are integrated into a large interdependent process or system. Like most machinery, at least a small percentage of such machines such as induction motors are prone to failure at any given time. In the case of induction motors, the majority of such failures can be attributed to either mechanical failures and/or thermally-induced failures of the motor insulation.

Other than normal aging, failures are typically due to: poor or no maintenance; improper application (e.g., wrong enclosure, excessive loading); and improper installation (e.g., misalignment, bad power, inverter mismatch). Even with normal aging failures, it is desirable to provide low cost failure prediction information for such machines.

Depending on the application, the failure of a machine in service can possibly lead to system or process down time, inconvenience, and possibly even a hazardous situation. Thus, it is desirable to diagnose the machinery for possible failure or faults early in order to avoid such problems. Absent special monitoring for certain motor problems, the problems may have an insidious effect in that although only a minor problem on the onset the problem could become serious if not detected. For example, insulation problems and electrical problems may not become apparent until irreversible damage has resulted. Likewise, bearing problems due to inadequate lubrication, contamination or other causes may not become apparent until irreversible damage has occurred.

Typically, to perform machine preventive maintenance, maintenance rounds are conducted where a maintenance person or vibration specialist will go to each critical machine in the plant and couple a portable recorder to each machine to measure vibrations of the machine. Vibration analysis is the established technique for determining the health of mechanical components in rotating machinery such as induction motors. The consistent analysis of the vibration signals taken at various times is dependent on the ability to reproduce the precise location and direction of mounting of the sensor (i.e., recorder). Consequently, portable recorders are deficient in obtaining reliable vibration data as compared to accelerometers permanently installed on the rotating machinery to be monitored.

Other types of portable recorders employed for collecting data relevant to motor health are ones that collect motor flux data, motor current data and/or motor temperature data. Many such portable recorders experience problems with consistency in data recovery because of the inherent difficulty associated with placing the portable recorder in the exact same position as when the previous recording was taken. Capturing current data remote from the motor will result in sampled data being altered due to power line characteristics (e.g., reflections, ringing). Capturing flux data from outside the motor will include the effects of winding end turns and the frame thus limiting its use to only very severe and specific fault detection.

Another method for obtaining data relating to the health of the motor is to mount current sensors (in the motor control cabinet) to the power lines feeding the motor. The current sensors collect current data which is used in current signature analysis to assess the health of the motor. However, intimate knowledge of the motor is generally required in order to conduct a thorough motor current signature analysis. But, many manufacturers of current signature analysis equipment do not have intimate knowledge of the motors that are to be analyzed with their equipment. Simply knowing the motor horsepower and line voltage is not sufficient for performing good current signature analysis. Rather, intimate details about the motor such as the number of rotor bars, rotor construction, the number of turns on the stator winding, windage and friction losses, etc. are needed. Generally, only the actual designer of the motor has such intimate information. Thus, current signature analysis devices fabricated by those other than the motor designer oftentimes result in inferior diagnostics because they are missing important motor design information. Consequently, the best such devices can do typically is provide general guidelines for spectral peaks within relatively broad frequency ranges and try to trend from sample to sample. Additionally, such current sensor devices located in the motor cabinets cannot monitor for vibration and temperature which are two important indicators of the health of the motor. In particular, mechanical problems of a motor usually are manifested most prominently via vibrations. Thus vibration analysis is still the desired method for analyzing a machine for mechanically related problems.

Furthermore, because such monitoring typically takes place at the motor, motor diagnosis related thereto may require large amounts of manpower to collect the data and then provide a remote computer with the data to perform analyses thereon. Moreover, such manual intensive methods are not amenable to performing trend analysis. Similarly, these methods do not allow for continual, ongoing data sampling. It is generally known that only a few minutes of uncontrolled vibration can have catastrophic consequences.

Consequently, there is a need in the art for a device and/or system for data collection and machine diagnosis which mitigates the manual intensiveness of conventional devices and systems.

SUMMARY OF THE INVENTION

The present invention provides for a data collection and diagnostic module for collecting machine data and processing the data to facilitate determining a health state of the machine as well as trending performance of the machine. The present invention will be described with respect to an AC induction motor, however, it is to be appreciated that the present invention has applicability to substantially any type of rotating machinery (such as gear boxes, pumps, generators, etc.)

The module is operatively coupled to a machine from which data is to be gathered and processed. In accordance with one embodiment of the invention a docking station is coupled to the machine. Data gathering sensors are positioned at suitable points on or within the machine to collect desired data. The sensors are operatively coupled to the docking station which serves as an interface for the module to collect the data. The module is designed to be coupleable to the docking station and easily removed from the docking station as well. Many conventional machine monitors are mounted to the machines in such a fashion that removal thereof is not so easy. Because many of the sensors are placed substantially permanently within the machine and coupled to the docking station, the module of the present invention can be quickly removed or inserted into the docking station without having to worry about proper positioning of sensors.

When the module is coupled to the docking station, the module receives data collected by the various sensors. The data is collected, processed and stored by the diagnostic module. The diagnostic module includes a memory sufficient to store substantial amounts of the raw data and/or processed. As a result, the diagnostic module may be employed to gather data for extended periods of time (eg., several weeks, several months or even several years). Data collection for extended periods of time affords for improved accuracy in machine diagnosis as well as substantially facilitating trending of machine performance and failure prediction. The frequency of data collection by the module may be suitably tailored as desired. Such extended data collection is highly conducive to gathering data from remote machines where networking is not practicable.

Furthermore, because the sensors may be strategically positioned on or within the machine as compared to the sensors being contained within the diagnostic module, the present invention provides for accurate and reliable data from which to base machine diagnostics and trending.

The module may have stored thereon machine design related data which will enhance processing of the raw data collected by the sensors. In other words, by correlating the raw data with knowledge relating to specific machine design parameters improved machine diagnostics is achieved over conventional devices and systems.

The diagnostic module may perform some or all of the following analyses on the collected data: (1) torque and speed; (2) temperature; (3) signal processing; (4) RMS; (5) Fast Fourier Transforms (FFT); (6) positive & negative sequence (e.g., sequence analysis is performed by taking the 3-phase power and decompressing it into positive and negative sequences in order to provide a goodness measurement of power); (7) vibration signature analysis; (8) current signature analysis; (9) neural network classification; and (9) expert system analyses.

Thus, the present invention provides for accomplishing a substantial portion if not all of the machine diagnostic processing and analyses locally—at the site of the machine. As a result, the amount of data that may be sent to another computer for additional processing is minimized therefore resulting in reduced bandwidth requirements by the present invention for data transmission.

In another embodiment of the invention, the docking station is also operatively coupled to a host computer (e.g., via hardwired network or wireless network). Such networking provides for the diagnostic module to transmit the stored raw data and processed data to the host computer to perform further analyses thereon. By networking a plurality of diagnostic modules to the host computer, the host computer can perform diagnostics on a process employing at least some of the machines operatively coupled to the diagnostic modules, respectively.

Another embodiment of the present invention provides for a self-diagnosing module which provides for the module to determine the health thereof. If the module determines that it is not operating properly, it may prompt a user to replace it with a new module.

Yet another embodiment of the invention provides for a distributed network where different modules operating within a system communicate with one another. For example, various modules of a process line may communicate with one another to keep track of the performance of their respective machines. If a problem results in the process, the modules may be employed to isolate the problem area (e.g., via an embedded process model). Such an embodiment also has applicability to situations where load sharing is performed by two or more machines. By allowing the modules cf the machines to communicate with one another, load sharing may be optimized. Alternatively, based on the diagnostic results, load sharing may be disabled and a disproportionate load given to certain machines to extend the useful life of degraded (e.g., failing) equipment.

The present invention provides for a replaceable module which provides for capturing machine data over extended period of time, and processing the data via various analytical tools to facilitate diagnosing a machine and/or trending the machine. Thus, an operator may readily switch modules during periodic rounds. It is to be appreciated that according to one aspect of the present invention a plurality of modules wherein one or more of the plurality of modules have different functions than other modules of the plurality may be employed.

In accordance with one aspect of the present invention, a dynamoelectric machine diagnostic system is provided. The system includes a docking station coupled to a dynamoelectric machine. A plurality of sensors are operatively coupled to the docking station, at least one of the sensors being positioned within the dynamoelectric machine for data gathering. A diagnostic module is adapted to be received by and coupled to the docking station so that the diagnostic module may collect data output from at least one of the plurality of sensors.

Another aspect of the present invention provides for a system for load sharing by a first and second dynamoelectric machine. The system includes a first diagnostic module operatively coupled to the first dynamoelectric machine. A second diagnostic module operatively is coupled to the second dynamoelectric machine, the second diagnostic module being operatively coupled to the first diagnostic module. The first diagnostic module and second diagnostic module coordinate with each other a data collection protocol to collect machine data respectively from the first and second dynamoelectric machines.

Yet another aspect of the present invention provides for a system for diagnosing the health state of a plurality of dynamoelectric machines. The system includes a host computer operatively coupled to a network backbone; a plurality of docking stations, each docking station coupled to a respective dynamoelectric machine of the plurality of machines, each docking station operatively coupled to the host computer via the network, each docking station being operatively coupled to at least one machine data collecting sensor positioned within the respective machine; and a plurality of diagnostic modules, each diagnostic module adapted to be received by and coupled to a respective one of the plurality of docking stations, each diagnostic module collecting data from the respective at least one sensor, each diagnostic module processing the collected data to facilitate diagnosing the health state of the respective machine.

In accordance with still another aspect of the present invention, a system for determining a health state of a dynamoelectric machine is provided. The system includes a first docking station coupled to the machine, the first docking station being operatively coupled to a first data collecting sensor positioned in the machine; a second docking station coupled to the machine, the second docking station being operatively coupled to a second data collecting sensor positioned in the machine; a first diagnostic module adapted to be coupled to the first docking station, the first diagnostic module receiving data collected by the first sensor; a second diagnostic module adapted to be coupled to the second docking station, the second diagnostic module receiving data collected by the second sensor, the second diagnostic module being operatively coupled to the first diagnostic module; wherein the first diagnostic module controls the second diagnostic module.

Another aspect of the present invention provides for a dynamoelectric machine diagnostic system which includes: a plurality of sensors for internally sensing a plurality of parameters of the machine; collection means for collecting data related to the sensed parameters; coupling means for operatively coupling the plurality sensors to the collection means; and processing means for processing the collected data.

The following descriptions and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered with the drawings.

BRIEF DESCRIPTION OF THE DRAWINGS

FIG. 3 is a front view of the data collection module connected to a docking port which is connected to the host computer in accordance with the present invention;

FIG. 5a is a graph of an instantaneous motor current signal for a motor having good bearings in accordance with one specific aspect of the present invention;

FIG. 5b is a graph of a Fast Fourier Transform signal representative of the instantaneous motor current signal of FIG. 5a;

FIG. 5c is a graph of a vibration signal for a motor having good bearings in accordance with one specific aspect of the present invention;

FIG. 5d is a graph of a Fast Fourier Transform signal representative of the vibration signal of FIG. 5c;

FIG. 6b is a graph of a Fast Fourier Transform signal representative of the instantaneous motor current signal of FIG. 6a;

FIG. 7 is a table diagram of vibration amplitudes over a range of frequencies, which may be used to facilitate diagnosing the state of a dynamoelectric machine in accordance with the present invention;

DETAILED DESCRIPTION OF THE INVENTION

Figure 1:
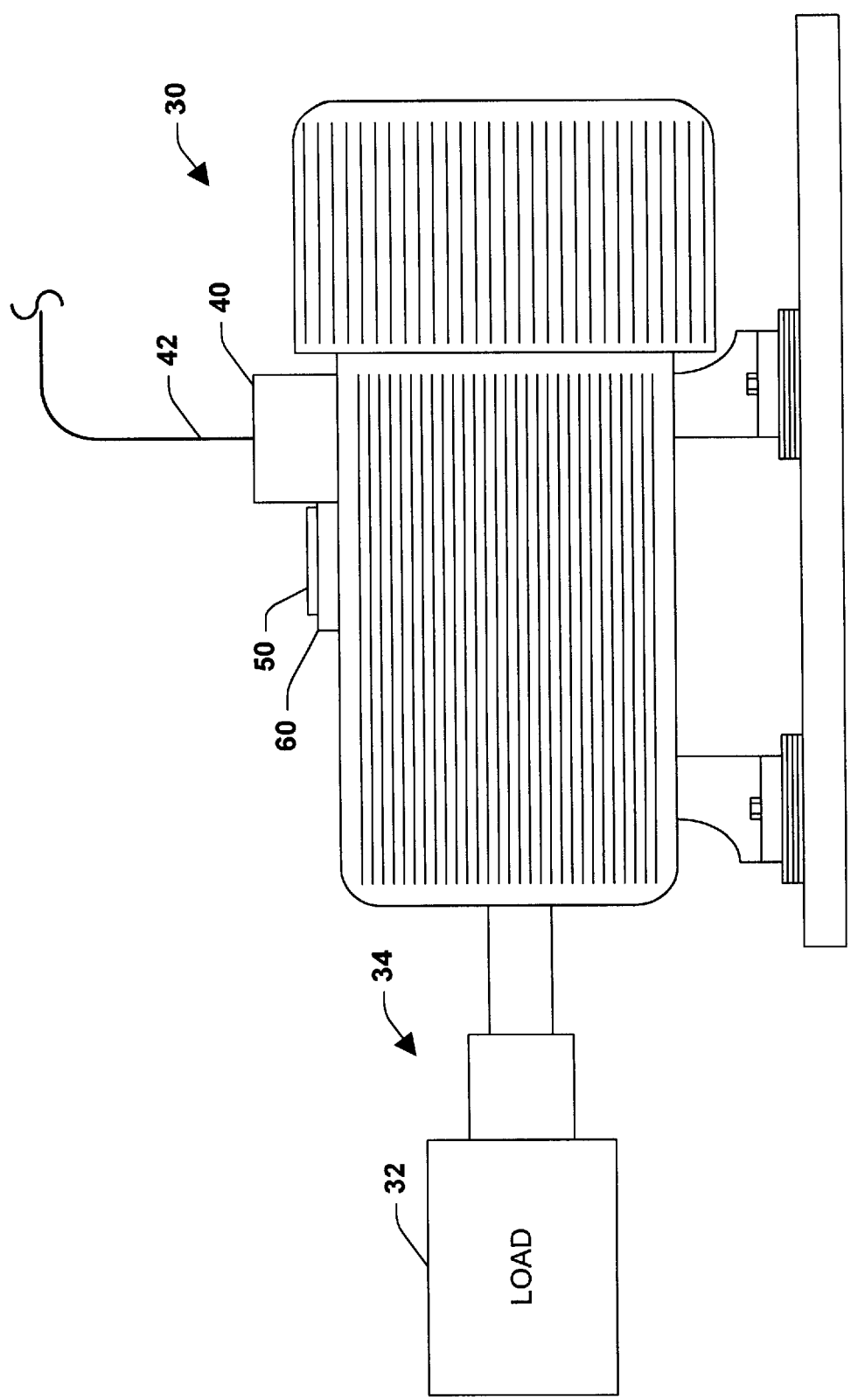
FIG. 1 is a side view of an integrated AC induction motor and data collection module in accordance with one particular aspect of the present invention.

The present invention will now be described with reference the drawings, wherein like reference numerals are used to refer to like elements throughout.

As is mentioned above, the present invention relates to a system for conveniently and cost effectively obtaining and using data for machinery diagnosis and failure prediction. In particular, the system employs a self contained, compact module which is coupleable to a docking station attached to a dynamoelectric machine. A plurality of sensors are suitably positioned within and about the machine to collect data. The sensors are operatively coupled to the docking station, and thus the module may collect the data by coupling to the docking station. The module is adapted to collect data for extended periods of time, and to process and store the data. As mentioned above, it is to be appreciated that the present invention may be applied to most rotating machinery (e.g., motors, pumps, generators, gear boxes) and/or systems.

Referring initially to FIG. 1, one specific environment in which the present invention may be employed is shown. A three-phase AC induction motor 30 is depicted driving a load 32 through a shaft coupling 34. The motor 30 includes a junction box 40 for receiving conductors from power lines via a conduit 42. The motor 30 is AC powered and operates at an AC power line frequency of 60 Hz. However, it is appreciated that different line frequencies (e.g., 50 Hz.) may be employed. A diagnostic module 50 is operatively coupled to the motor 30 via a docking station 60. As will be discussed in greater detail below, various sensors 62 (e.g., accelerometers, thermocouples, optical sensors, temperature sensors, encoders, viscosity sensors, flux sensors) (see FIG. 4a) are strategically positioned within and/or about the motor 30 to collect desired data. These sensors 62 are also coupled to the docking station 60. Thus, the diagnostic module 50 collects and analyzes raw motor data collected from within the motor 30 via the sensors 62. As a result of employing the certain sensors 62 (e.g., accelerometers, encoders, thermocouples, temperature detectors, viscosity sensors, flux sensors) internal to the motor, the data being analyzed is highly accurate and affords for making accurate and and reliable determinations relating to the performance and health of the motor 30, future health of the motor 30, and health and future health of a process employing the motor 30.

The docking station 60 facilitates providing certain sensors internal to the motor 30. Some conventional data collection devices mount to the motors but since they do not employ docking stations, the sensors of such devices typically are provided within the data collection itself. Consequently, a such conventional data collection devices are inferior to the present invention at least with respect to the quality of the data collected. More particularly, the quality of data collected from sensors external to the motor will be less than the quality of data collected by sensors internal to the motor. The present invention affords for suitably positioning sensors 62 internal to the motor 30. Sensors placed internal to the motor 30 may be strategically located where sensed information is closely related to the health of the motor. External sensors will sense information which includes the affects of thermal conductivity, separating material, and related reflected and diffused a sensed values.

The docking station 60 further provides for the sensors 62 to be permanently positioned at desired optimal locations. Conventional data collection devices are removed periodically from the machine from which data is being gathered, and subsequent monitoring requires an attempt to reposition the conventional data collection device at roughly the same position on the machine as it was previously placed. Such consistent repositioning oftentimes does not occur resulting in inconsistent placement of the sensors within the conventional data collection devices with respect to the machine being measured. The present invention via the docking station 60 mitigates this deficiency of conventional data collection devices.

Figure 2:
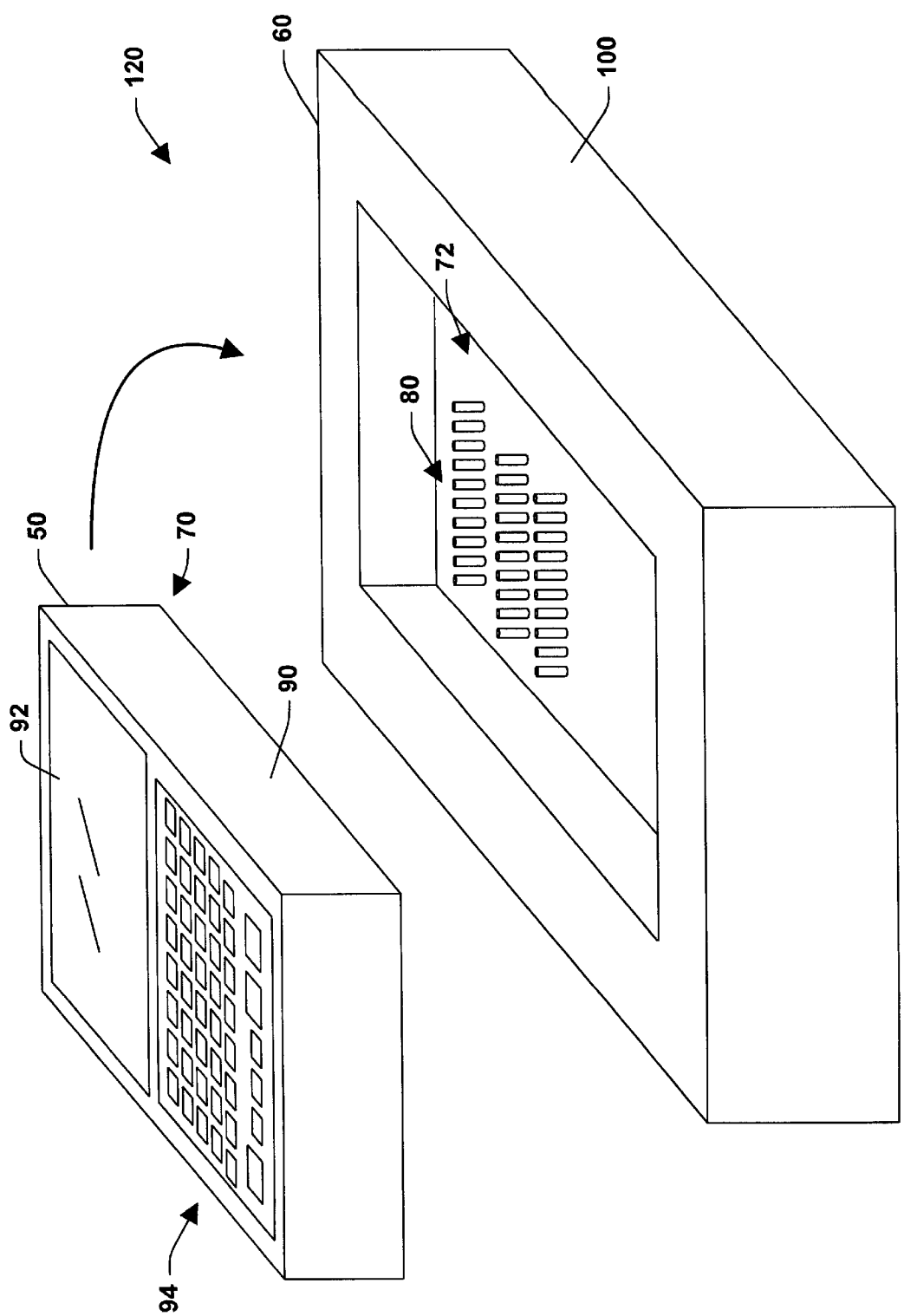
FIG. 2 is a perspective view of a diagnostic module and docking station in accordance with the present invention.

FIG. 2 is a perspective view of the diagnostic module 50 and the docking station 60. As can be seen, the base 70 of the diagnostic module 50 is adapted to fit snuggly into a receiving section 72 of the docking station 60. The diagnostic module 50 is maintained firmly within the receiving section 72 via frictional contact between the outer walls of the base 70 and the inner walls of the receiving section 72. Optionally, spring loaded clips or clamps may be employed to secure the diagnostic module 50—this may be desirable in the case of vertically mounted modules 50. The receiving section 72 includes a plurality of male pin connectors 80 which are designed to mate with corresponding female connectors (not shown) located on the underside of the diagnostic module 50. The pin connectors 80 are operatively coupled to the various sensors disposed within and/or about the machine 30 to collect machine data, and the pin connectors 80 and female connectors (not shown) provide a means for the diagnostic module 50 to operatively couple, to the sensors 62 and collect the machine data.

Although the diagnostic module 50 is shown with a rectangular base, and the docking station 60 with a corresponding rectangular receiving section, it is to be appreciated that the diagnostic module 50 and receiving section 72 of the docking station 60 may be of any form and/or shape suitable for carrying out the present invention and such is intended to fall within the scope of the hereto appended claims. Furthermore, any suitable docking or coupling system suitable for carrying out the present invention may be employed and is intended to fall within the scope of the hereto appended claims.

The diagnostic module 50 includes a housing 90 that is preferably made of metal, high strength plastic, or the like. The housing 90 is an elongated enclosure of a size and including such contours as to conveniently fit into the open palm of a user. In one specific embodiment of the present invention, the diagnostic module 50 is fabricated in accordance with a black-box recorder type design as is well known in the art. As such, the diagnostic module 50 would be capable of withstanding damage from catastrophic failure of the machine 30 (erg., explosion) and/or fire, water, explosion, etc. within the plant employing the machine 30. Such a configuration would provide for safe retention of the machine data which could be employed in possibly determining the cause of the catastrophic machine failure or plant disaster.

The diagnostic module 50 optionally includes a display 92 such as a liquid crystal display (LCD) or the like. The display 14 may be a fine pitch LCD operated as a standard CGA display with a resolution of 640×350 pixels. As is conventional, the display 92 functions to display data or other information relating to ordinary operation of the diagnostic module 50 For example, the display 92 may display general machine operating information such as for example, speed, temperature, torque, voltage, current, related waveforms, bearing health, insulation status, etc. In general, the display 92 provides for a user to quickly visually access and confirm input information relating to the machine 30 and/or operating condition of the diagnostic module 50. Additionally, the display 92 may display a variety of functions that are executable by the diagnostic module 50. As will be discussed in greater detail below, the display 92 is controlled by electronic circuitry within the diagnostic module 50.

The diagnostic module 50 optionally also includes a set of user interface keys 94 for allowing the user to input information and/or operational commands. Although, only a few keys 94 are shown it is to be appreciated that the diagnostic module 50 may include any suitable number of keys for carrying out desired operations. The interface keys 94 may also include a key for manually turning the diagnostic module 50 on and off.

In particular, machines are often employed in harsh environments where heat and exposure to water and other chemicals may be extensive. Thus, the housing of the diagnostic module and housing 100 of the docking station 60 are suitably weatherproofed to protect the diagnostic module 50 and docking station 60. For example, a rubber flange and gasket may be incorporated into the design of the diagnostic module 50 and docking station 60. In addition, the diagnostic module 50 and/or the docking station 60 may be hermetically sealed or potted as required.

FIG. 3 is a schematic illustration of a host computer 110 coupled to a docking station 112 for receiving the diagnostic module 50 after it has completed a predetermined term of data collections. The docking station 112 is similar in design to the docking station 60 and thus detailed discussion related thereto is omitted for sake of brevity. The docking station 112 includes a communications link to the host computer 110 and thus provides for downloaded data from the diagnostic module 50 to the host computer 110. The collected machine raw data and/or processed data is retrieved from the diagnostic module 50 by the host computer 110 via the docking station 112. The host computer 110 may perform further analyses on the raw data and/or processed data in order to facilitate determining a health state of the machine 30 as will be discussed in greater detail below. The docking station 112 also provides for an interface between the host computer 110 and the diagnostic module 50 such the the host computer 110 may be employed to reprogram the diagnostic module 50 and/or update the diagnostic module 50 with new motor design information, for example.

Figure 4A:
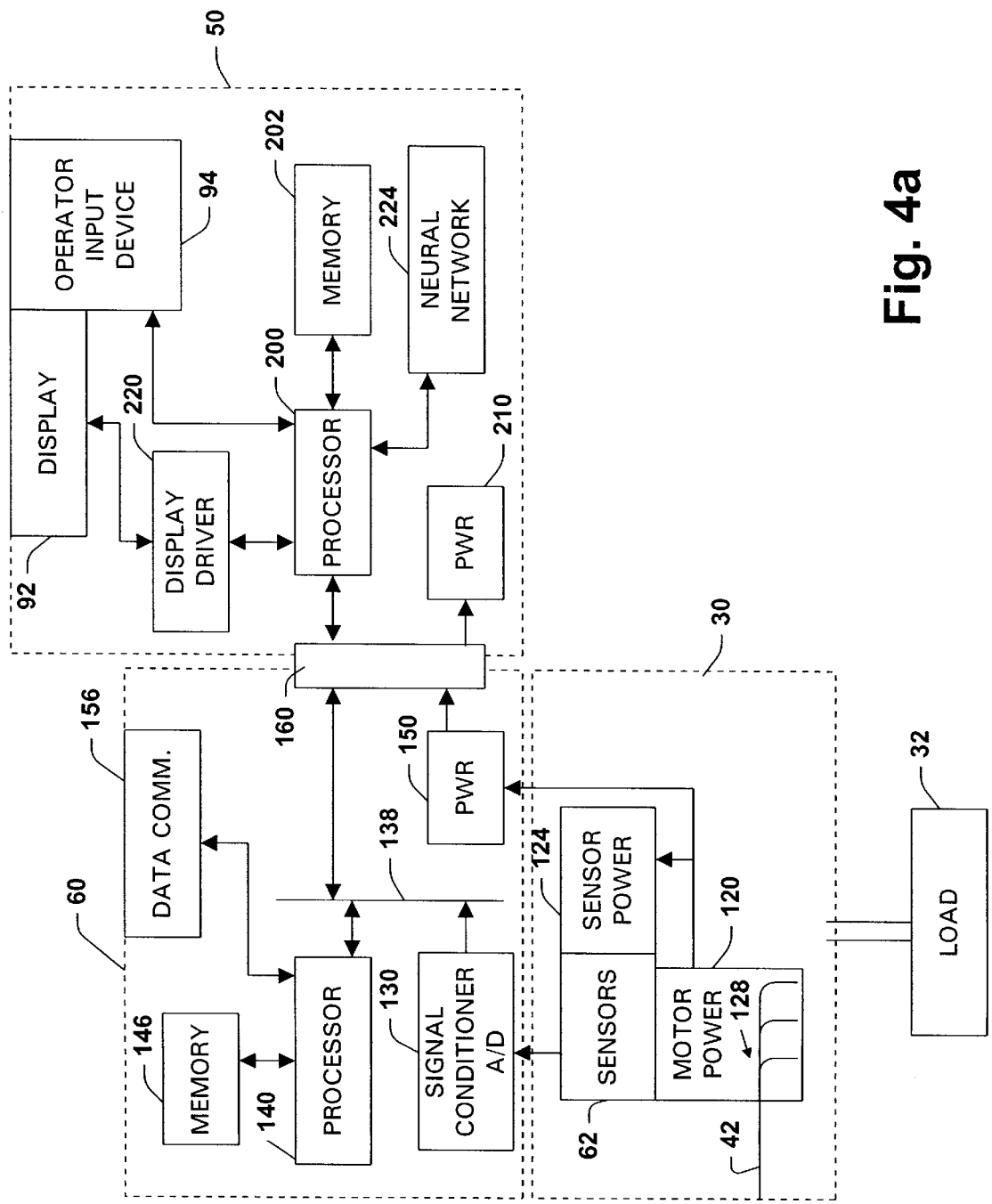
FIG. 4a is a schematic block diagram of a data collection diagnostic system in accordance with one specific aspect of the present invention.

Referring now to FIG. 4a, a schematic representation of the machine 30, docking station 60 and diagnostic module 50 is shown in accordance with one specific embodiment of the present invention. As can be seen, the docking station 60 is coupled to the machine 30, and the diagnostic module 50 is coupled to the docking station 60. The motor 30 includes the plurality of sensors 62. Power is provided to the motor 30 via power lines 128. Sensor power 124 is obtained from the motor power lines. It will be appreciated that the motor power is suitably conditioned (e.g., transformed) so as to provide the sensors 62 with appropriate power. The sensors 62 may include: accelerometer(s); temperature sensor(s); thermocouple(s); encoder(s); viscosity sensor(s); voltage sensor(s); current sensor(s); flux sensor(s); optical sensor(s); wear sensor(s); lube sensors; acoustic sensors; brush sensors; ultrasonic sensors, and any other types of sensors suitable for facilitating collecting desired machine related data and carrying out the present invention.

The sensors 62 include at least one motor current sensor and in the preferred embodiment three motor current sensors each of which are connected directly to different phase power lead wires (shown as motor power 128) connecting the machine 30 to a source of power. The motor current sensors may be Hall-effect sensors on each power line which generate a signal corresponding to the current flowing through the respective power leads. Alternatively, it will be appreciated that line current may be monitored by separate split core current transformers each clipped on a phase line. As is known, line current is not a direct operating parameter of the motor 30, however, various operating conditions of the motor may be correlated with and derived from line current signatures as is known in the art.

The docking station 60 includes a multi-channel analog to digital (A/D) converter and signal conditioner 130 which is operatively coupled to the sensors 62. The A/D converter 130 provides for converting the analog sensor signals into digital form suitable for processing by a processor. The signal conditioner includes a demodulator, in this case an RMS-to-DC converter, a device which produces a voltage proportional to the root-mean square (RMS) value (over a preset time interval), of the motor current signal. The demodulated signal is fed through a low pass filter having an upper frequency cutoff below 60 Hz to remove spectra associated with the 60 Hz line frequency and its harmonics. Preferably the demodulation and filtering is implemented via software, however, it is to be appreciated that hardware could be used as well—both techniques are intended to fall within the scope in of the present invention.

As will be discussed in greater detail below, the conditioned signals are employed by the diagnostic module 50 to facilitate making a health determination of the machine 30. For example, the diagnostic module 50 may extract current signature information from the conditioned current signal obtained from the raw motor current (see e.g., discussion relating to FIGS. 5a, 5b, 6a and 6b). The current signature information may be analyzed across a wide range of frequencies (e.g., fundamental, side band and harmonic ranges) to allow for the diagnostic module 50 to determine the state of the motor 30. However, it should be appreciated that the analysis. can be narrowly performed over select frequencies of interest such as critical ball pass frequencies, outer race frequencies, etc., for example.

Similarly, the vibration sensors are employed to collect vibration data relating to the motor 30. Vibration analysis is the established technique for determining the health of mechanical components in rotating machinery such as induction motors. The motor vibration data includes the sum of all the mechanical load changes which refer back to the motor 30. The vibration data also includes effects due to bearing faults and rotor unbalance. Accordingly, the motor vibration information is an indicator of a variety of mechanical and electrical modulations associated with the state of the motor 30. For example, various motor defect situations such as bearing wear, bent shaft, cracks in the various parts of the motor, etc. all manifest themselves through vibrations of the motor 30 (see e.g., discussion relating to FIGS. 5c, 5d, 6c and 6d). To obtain vibration data for machinery analysis, accelerometers as well as associated sampling and filtering techniques are often employed. Larger machines and/or systems may employ proximity sensors to determine vibration.

In using accelerometers, the accelerometers are mounted on the machine being monitored. The. location and orientation of the accelerometers is significant to the characteristics of the signal obtained. A vibration generated in one part of the machine is transmitted through the solids separating the source from the accelerometer. The analysis of the vibration signals taken at various times is dependent on the ability to reproduce the precise location and direction of mounting of the accelerometers. Thus, it is preferred that the accelerometers and/or their mounting fixtures be permanently installed on the motor to be monitored. Unlike some conventional machine diagnostic devices, the present invention affords for such permanent placement of the vibration sensors integral to or embedded in the machine being monitored.

Since accelerometers sense vibration primarily in one direction (or one plane), multiple sensors are typically necessary to detect the vibrations generated in other directions and in different parts of some equipment. Thus, in order to sense all significant vibration directions, it may be necessary to install multipleaxis sensors. The results obtained are then combined and analyzed to develop the diagnostic information. To obtain good vibration data in order to perform the analysis it is desired to cover at least 5 axes with accelerometers (e.g., a 3-axis accelerometer at the load-end (x, y and z-axes where the z-axis is the axial direction parallel to the shaft) of the machine and a 2-axis accelerometer at the other end (x and y axis)).

Returning back to a discussion of other components of the docking station 60 (FIG. 4a), a bus 138 is provided for coupling various components of the docking station 60 and diagnostic module 50. The A/D converter 130 and a processor 140 of the docking station 60 are coupled to the bus 138. The processor 140 is programmed to control and operate the various components within the docking station 60 in order to carry out the various functions described herein. The processor or CPU 140 may be any of a plurality of processors, such as the p24T, Pentium 50/75, Pentium 60/90, and Pentium 66/100, Pentium PRO and Pentium 2, and other similar and compatible processors. The manner in which the processor 140 can be programmed to carry out the functions relating to the present invention will be readily apparent to those having ordinary skill in the art based on the description provided herein.

A memory 146 tied to the processor 140 is also included in the docking station 60 and serves to store program code executed by the processor 140 for carrying out operating functions of the docking station 60 as described herein. The memory 146 includes read only memory (ROM) and random access memory (RAM). The ROM contains among other code the Basic Input-Output System (BIOS) which controls the basic hardware operations of the docking station 60 and pre-stored motor design parameters (e.g., number of slots). The RAM is the main memory into which the operating system and application programs are loaded and temporary storage of raw data and analysis results.

The docking station 60 includes a power supply 150 which derives 10 power from the motor power 120. The docking station 60 also includes a data communication port 156 which is employed to interface the processor 140 with a remote computing device via a local area network (LAN) or wide area network (WAN), for example.

The docking station 60 and diagnostic module 50 interface with each other via an interface 160 which includes the pin connecters 80 (FIG. 2) and corresponding female connectors (not shown). As can be seen, the bus 138 and power supply 150 are connected to the interface 160.

Turning now to the diagnostic module 50, a processor 200 is responsible for controlling the general operation of the diagnostic module 50. The processor 200 is programmed to control and operate the various components within the diagnostics module 50 in order to carry out the various functions described herein. The processor or CPU 200 can be any of a plurality of suitable processors, such as the p24T, Pentium 50/75, Pentium 60/90, and Pentium 66/100, Pentium PRO and Pentium 2, Motorola MC68HC16Z1CFC16 and other similar and compatible processors. The manner in which the processor 200 can be programmed to carry out the functions relating to the present invention will be readily apparent to those having ordinary skill in the art based on the description provided herein and thus further discussion related thereto is omitted for sake of brevity.

A memory 202 which is coupled to the processor 200 is also included in the motor diagnostics module 50 and serves to store program code executed by the processor 200 for carrying out operating functions of the motor diagnostics module 50 as described herein. The memory 202 also serves as a storage medium for temporarily storing information such as vibration analysis data, current signature analysis data, motor temperature data, motor voltage data, shaft rotation data, vibration and current spectral tables, and the like which may be eventually downloaded to the host computer 110. The memory 202 may also include machine specific data which is used to facilitate machine diagnosis. For mass data storage, the memory 202 may include a hard disk drive (erg., 10 Gigabyte hard drive) and/or removable solid state memory (e.g., PCMCIA memory card).

The memory 202 includes read only memory (ROM) and random access memory (RAM). The ROM contains among other code the Basic Input-Output System (BIOS) which controls the basic hardware operations of the diagnostics module 50. The RAM is the main memory into which the operating system and application programs are loaded.

Power is provided to the processor 200 and other components forming the diagnostic module 50 from a power system 210 which may optionally derive power from the docking station 60 when the diagnostic module 50 is docked to the docking station 60. The power system 210 may also include a battery capable of powering the diagnostic module for extended periods off time. It will be appreciated that the power system 210 may also include a charging system for charging the battery when the diagnostic module 50 is docked to the docking station 60.

The diagnostic module 50 optionally includes the display 92 which is coupled to the processor 200 via a display driver circuit 220 as is conventional. The display 92 may be a liquid crystal display (LCD) or the like. In the preferred embodiment, the display 92 is a fine pitch liquid crystal display operated as a standard CGA display with a resolution of 640×350 pixels. The display 92 functions to display data or other information relating to ordinary operation of the motor 30. For example, the display 92 may display a set of discrete motor condition indicia such as, for example, fault indicia, caution indicia, and normal operation indicia which is displayed to the operator and may be transmitted over a network. Additionally, the display 92 may display a variety of functions indicating the operation of the motor 30. The display 92 is capable of displaying both alphanumeric and graphical characters.

The operator input device 94 is also coupled to the processor 200, and as discussed above affords for a user to interact with the diagnostic module 50.

A neural network 224 is coupled to the processor 200 to facilitate data analysis and processing. The use of neural networks for motor diagnostics is well known in the art and thus further discussion relating thereto is omitted for sake of brevity.

Figure 4B:
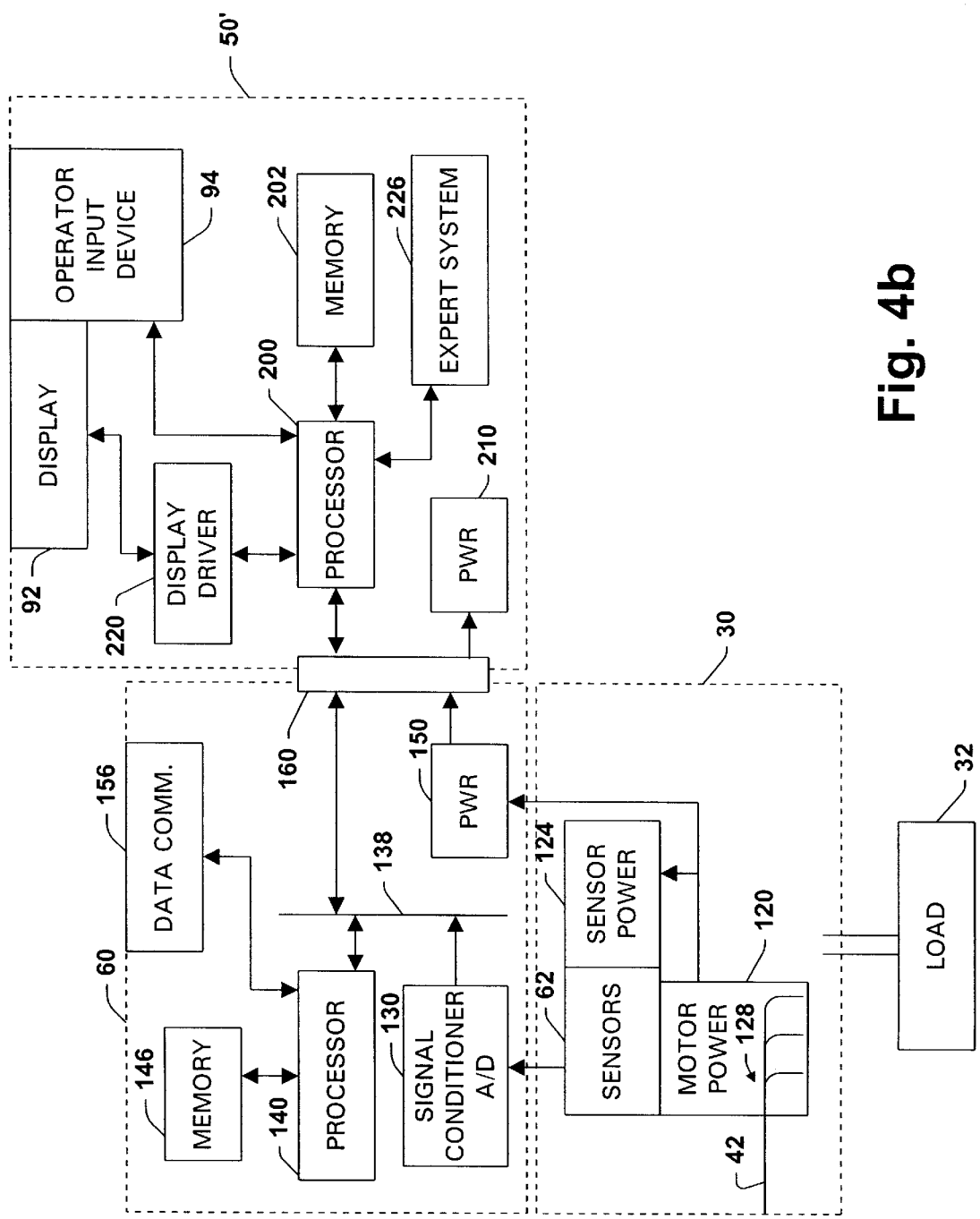
FIG. 4b is a schematic block diagram of a data collection diagnostic system in accordance with one specific aspect of the present invention.

Another embodiment of the diagnostic module 50' employs an expert system 226 in place of a neural network as shown in FIG. 4b. The expert system 226 provides for classification based on inference to derive more knowledge about a subject and in turn employ logical reasoning in making a decision regarding the health of the machinery or recommend action.

Expert systems are typically knowledge-based rule-driven systems. The expert system 226 is employed in accordance with the present invention by establishing a hardware or software based program which receives input from a knowledge expert as to the nature of the items being sought for classification—in this case motor state. That is, during the training, an expert generates a rule or set of rules for each decision and stores given data into the knowledge base. The expert system 226 will then employ an "inference engine" to establish the health of the system or machine based upon codified expert level knowledge.

Figure 4C:
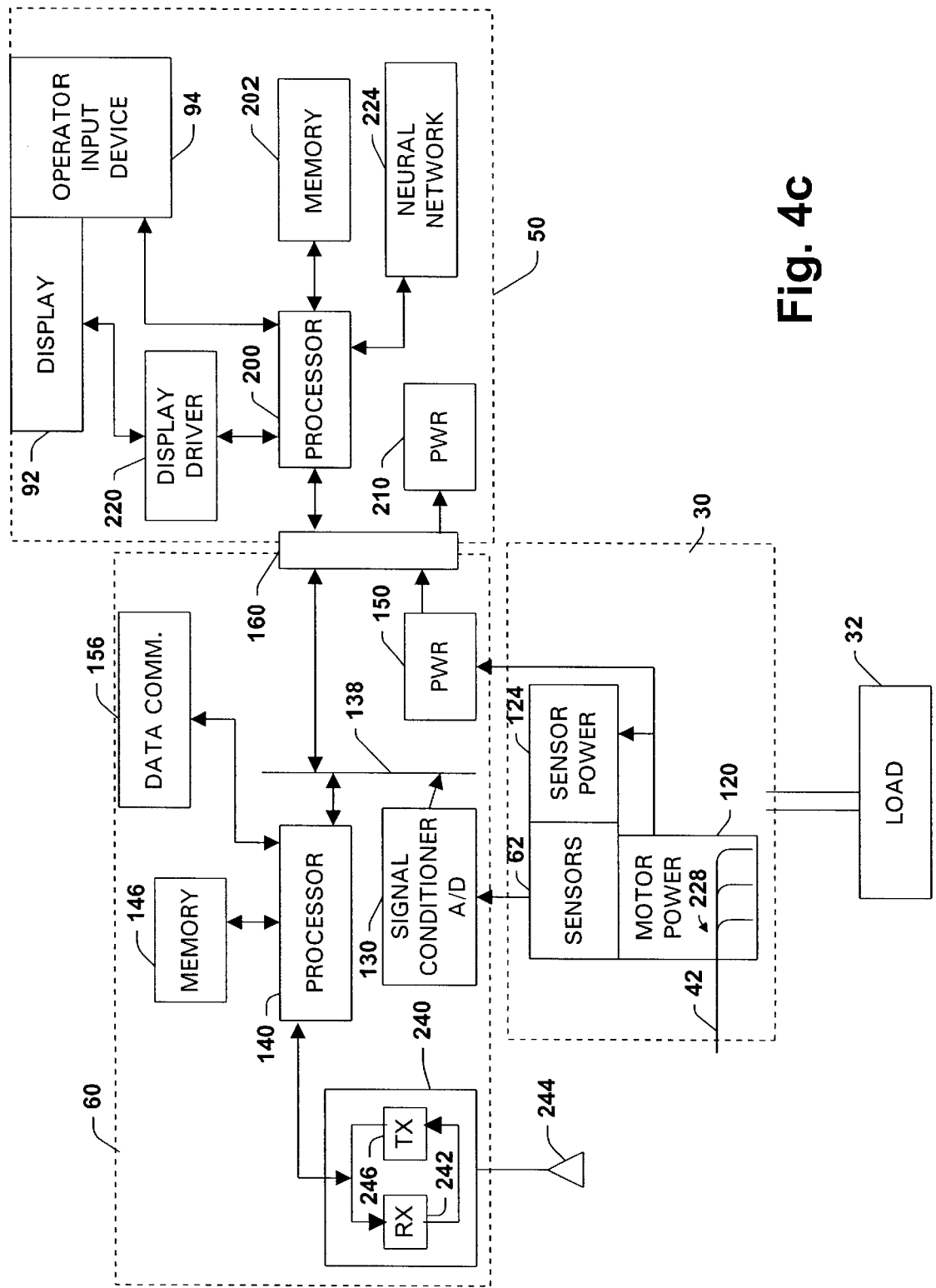
FIG. 4c is a schematic block diagram of a data collection diagnostic system in accordance with one specific aspect of the present invention.

Turning now to FIG. 4c, another embodiment of the present invention is shown where the docking station 60 includes an RF section 240 connected to the processor 140. The RF section 240 includes an RF receiver 242 which receives RF transmissions from a remote computing device for example via an antenna 244 and demodulates the signal to obtain digital information modulated therein. The RF section 240 also includes an RF transmitter 246 for transmitting information to the remote device for example.

Figure 4D:
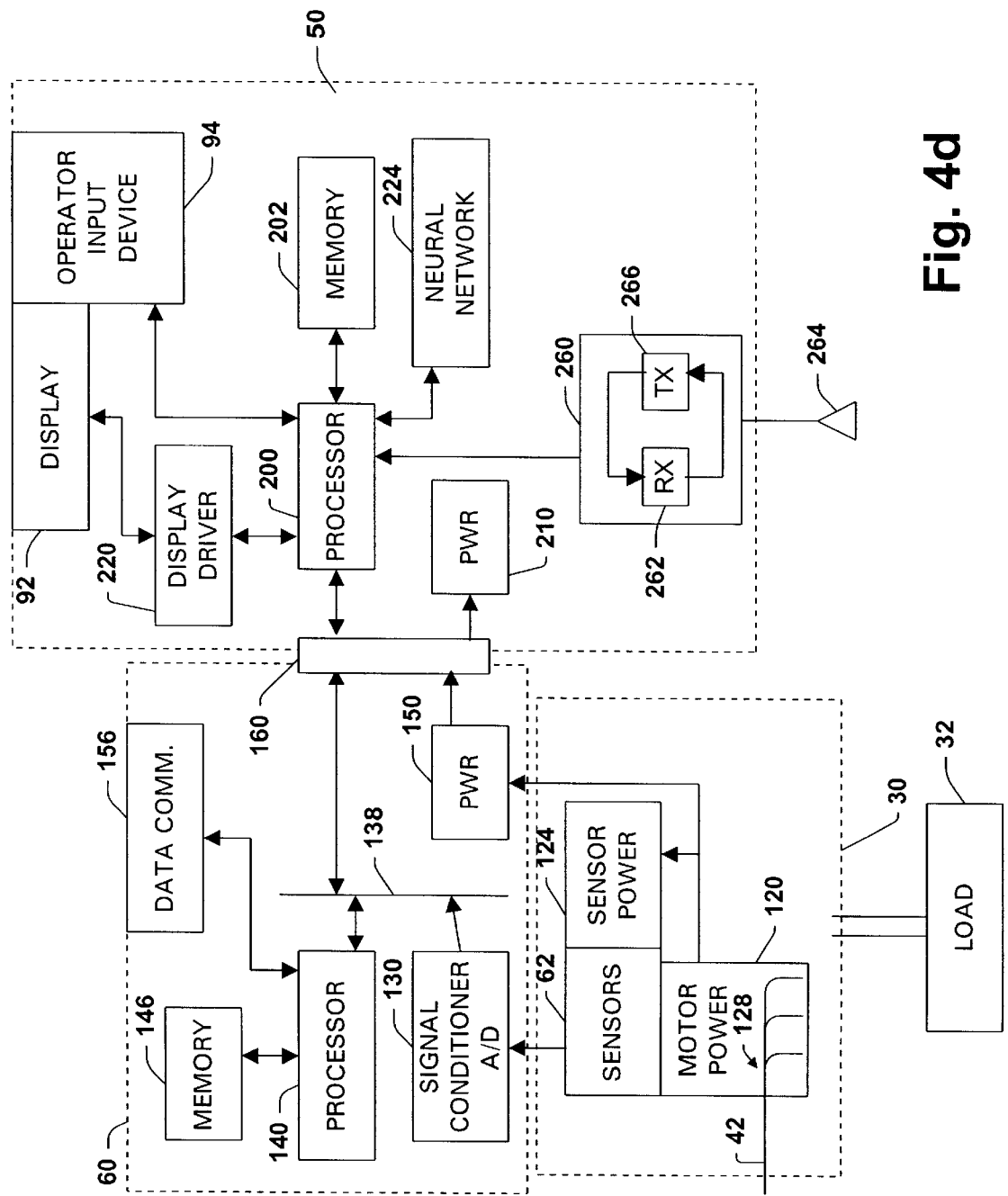
FIG. 4d is a schematic block diagram of a data collection diagnostic system in accordance with one specific aspect of the present invention.

FIG. 4d illustrates yet another embodiment of the present invention wherein the diagnostic module 50 includes an RF section 260 connected to the processor 200. The RF section 260 includes an RF receiver 262 which receives RF transmissions from a remote device for example via an antenna 264 and demodulates the signal to obtain digital information modulated therein. The RF section 260 also includes an RF transmitter 266 for transmitting information to the remote device for example.

Figure 4E:
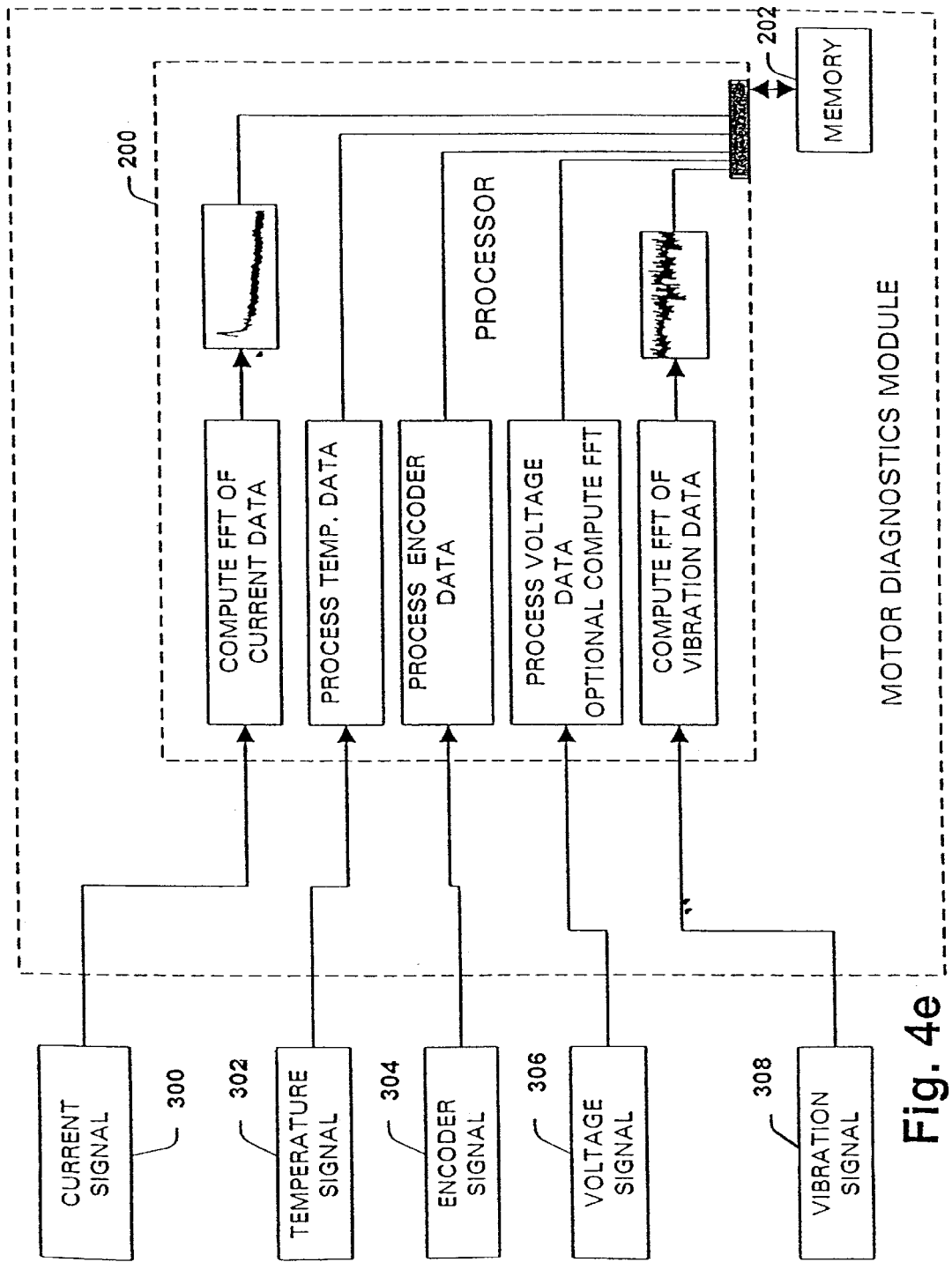
FIG. 4e is a functional block diagram illustrating collection of data relevant to motor health and processing of the data by a dynamoelectric machine diagnostic module in accordance with one specific aspect of the present invention.

Turning now to FIG. 4e, a functional block diagram representing the collection of data relevant to the health of the motor 30 and the pre-processing thereof by the diagnostics module 50 is shown. Initially, various; sensors are set up to collect motor data. It is to be understood that the present figure is intended to be a representative example of one specific embodiment of the present invention. For ease of understanding, this example is limited to preprocessing of five signals from five types of sensors. However, it is to be appreciated that many more types of signals from many other types of sensors may be employed in accordance with the present invention and are intended to fall within the scope of the hereto appended claims.

FIG. 4e shows five types of signals (current signals, temperature signals, encoder signals, voltage signals, and vibration signals). The current signals 300 are collected by current sensors (not shown) which collect data relating to motor current from the power leads feeding the motor 30. The conditioned and digital current data 300 is provided to the processor 200 which computes fast Fourier transforms (FFT) of the current data for use in current signature analysis.

The temperature signals 302 are provided from temperature sensors (not shown—preferably in the form of thermocouples) which are positioned in suitable areas of the motor 30 to take temperature measurements thereof. For example, a temperature sensor may be positioned to take temperature readings at the front bearings of the motor 30. Another temperature sensor may be located in the stator windings of the motor, and yet another temperature sensor may be positioned to take temperature readings of the rear bearings of the motor. The digital temperature data 302 is provided to the processor 200 for processing.

Encoder data 304 is obtained from an encoder (not shown) suitably positioned about the motor 30 to take readings relating to motor shaft rotation. Like the other data, the encoder data 304 which is conditioned and converted to digital form is processed by the processor 200.

Voltage data 306 is obtained from a voltage sensor (not shown) suitably positioned to obtain voltage data relating to the motor 30. The conditioned, digital voltage data 306 is processed by the processor 200.

As noted above, the motor 30 is also equipped with at least one vibration sensor (not shown) such as an accelerometer for taking sampled vibration data relating to the operation of the motor 30. In the preferred embodiment, a set of vibration sensors is mechanically and rigidly connected to the casing of the motor 30. A three-axis accelerometer may be located at the load end bearing of the motor 30, and a two-axis accelerometer may be located at the other end of the motor 30. However, the present invention may be carried out with one, single-axis accelerometer. Preferably, the vibration sensors are laboratory-grade accelerometers such as those manufactured by PCB Piezoelectronics, Inc. Part No. 353B16 and providing 10 mv/g. However, it will be appreciated that any vibration sensor or proximity sensor suitable for carrying out the present invention may be employed. The analog signals from the vibration sensors are converted to digital signals by the A/D converter 130 for processing by the processor 200. The accelerometer performs its own signal conditioning and therefore its analog vibration signal is input directly to the A/D 130.

The processor 200 controls the signal sampling and digitizing rate as well as any buffering of the digitized signals 300, 306, and 308 of the sampled data that might be needed. The data collection rate is carried out at for example 26,203 samples per second over a period of 8 seconds. This data collection rate provides sufficient data upon which the processor 200 can generate a comprehensive frequency spectrum of the motor current and motor vibration signals suitable for analysis using commercially available Fast Fourier Transform software such as for example MATLAB by The Math Works. The FFTs of the current signal data, voltage data, and the vibration signal data are discretized over N number of points for ease of processing. In the preferred embodiment, N=2,048, however, it will be appreciated that the FFTs of each signal may be discretized over any suitable number of points. Although, FIG. 4e illustrates FFTs being generated for only the vibration, voltage and current data for ease of understanding, it is to be understood and appreciated that FFTs may be generated for the other data signals (e.g., temperature and encoder) as well.

Referring briefly to FIGS. 5a–5d and 6a–6d, representative graphs of motor current data, transformed motor current data, motor vibration data and transformed motor vibration data for the motor 30 with good bearings and the motor 30 with bad bearings are shown. The diagnostic module 50 may analyze such data and based on the respective signatures of the current and vibration data make determinations relating to the health of the motor 30 and/or process employing the motor 30. In particular, FIG. 5a is a plot of raw, sampled time domain, current data of a motor 30 with good bearings. FIG. 5b is a corresponding frequency spectrum plot of the raw current data of FIG. 5a. FIG. 5c is a plot of the raw acceleration (i.e., vibration data) taken during the same time frame as the raw current data of FIG. 5a. FIG. 5d is a frequency spectrum plot corresponding to the raw acceleration data of FIG. 5c.

Figure 6B:
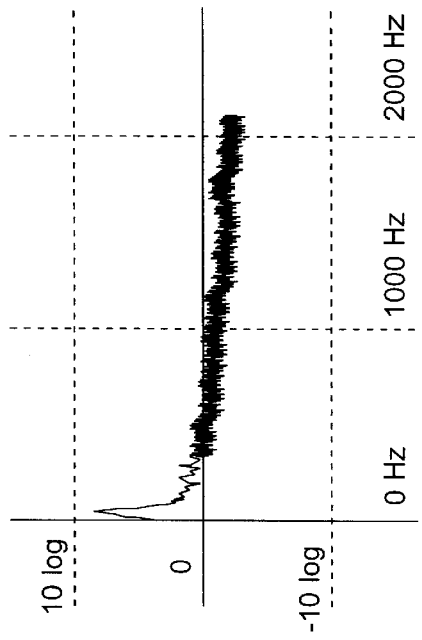
Figure 6D:
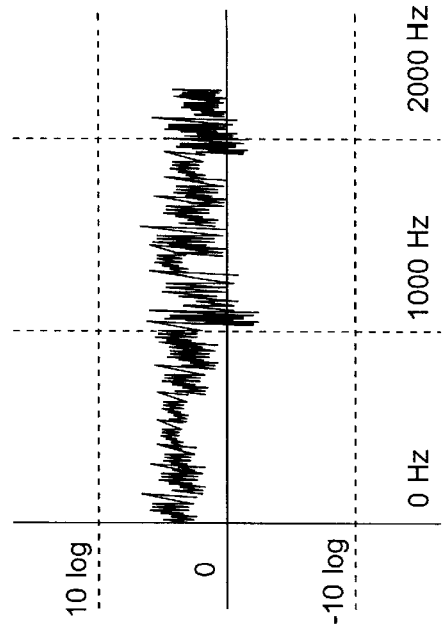
FIG. 6d is a graph of a Fast Fourier Transform signal representative of the vibration signal of FIG. 6c.
Figure 6A:
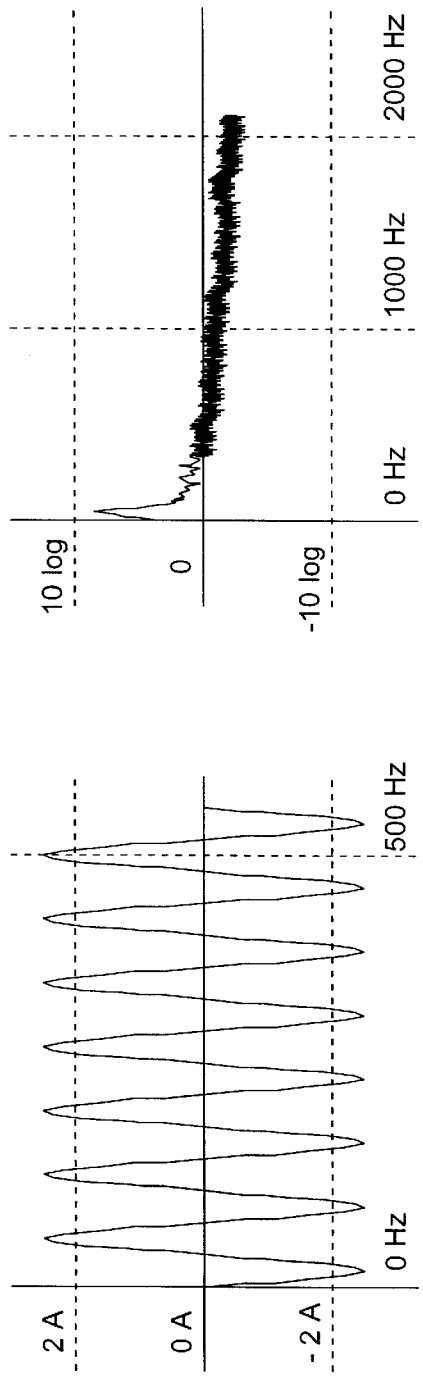
FIG. 6a is a graph of an instantaneous motor current signal for a motor having a bad bearing in accordance with one specific aspect of the present invention.
Figure 6C:
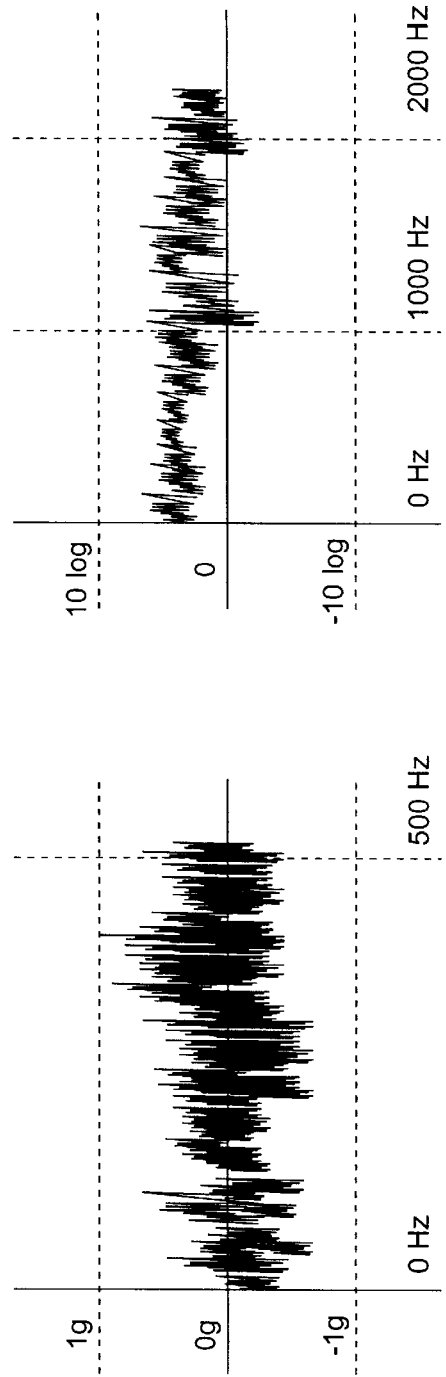
FIG. 6c is a graph of a vibration signal for a motor having a bad bearing in accordance with one specific aspect of the present invention.

FIG. 6a is a plot of raw current data of the motor 30 with a bad bearing. In this example, bearing surfaces have been degraded by operating the motor with lubrication contaminated with silicon carbide (SiC) grit. FIG. 6b is a corresponding frequency spectrum plot of the raw current data of FIG. 6a. FIG. 6c is a plot of the raw acceleration (i.e., vibration data) taken during the same time frame as the raw current data of FIG. 6a. FIG. 6d is a frequency spectrum plot corresponding to the raw acceleration data of FIG. 6c. A more detailed discussion regarding signature analysis is provided below in connection with FIG. 7.

Returning back to FIG. 4e, once the processor 200 has processed all of the respective motor data, the processed data may be stored in the memory along with the unprocessed data if desired. The processor 200 of the diagnostic module 50 may make a health assessment of the motor 30 if desired. Alternatively, the preprocessed and/or raw sensor data may be delivered to the host computer 110 for analysis. This is achieved by undocking the diagnostic module 50 and redocking it into the docking station 112 coupled to the host computer 110 (see FIG. 3). The host computer 112 may then make determinations as to the health of the motor 30 based on the data received from the diagnostic module 50. Accordingly, motor maintenance can be scheduled to correspond with the state of the motor. Additionally, the processed data can be compiled for trend analysis and forecasting. Since the diagnostic module 50 is integrated with the motor, the data sampling rate can be substantially high thus providing for improved highly accurate and up to date data relating to the current and future health of the motor 30.

It will be appreciated that the memory 146 of the docking station may contain motor specific design information which the processor 200 of the diagnostic module 50 may access to facilitate making a health determination of the motor 30. Alternatively, the memory 202 of the diagnostic module 50 may store design information of all or some of the types of machines it may be collecting data related thereto. The docking station 60 may include some sort of identifying means (e.g., bar code, electrical signal) for identifying to the diagnostic module 50 which type of machine the docking station 60 is coupled to. Thus, the diagnostic module 50 may then access from its memory 202 relevant information corresponding to the particular type of machine.

The diagnostic module 50 may perform many of the tasks (e.g., motor diagnosis, trend analysis, forecasting) that could be performed by the host computer 110.

Turning now to FIG. 7 a table 340 is shown which the processor 200 may access when performing vibration analysis to diagnose the health of the motor 30. The table 340 includes vibration amplitude data ($A_O$ thru $A_z$) over a range of frequencies ($f_o$ thru $f_n$). The table 340 is stored in the memory 202 of the motor diagnostic module 50 so as to be easily accessible by the processor 200 or alternatively stored in the memory (not shown) of the host computer 110 so as to be easily accessible to the processor (not shown) of the host computer 110. The table 340 includes various health states of the motor shown generally at 342 which correspond to vibration amplitudes over the frequency range $f_o$ thru $f_n$. For example, referring to the row identified by reference numeral 346, when the vibration amplitudes are sufficiently close to $A_{234}$ at $f_{o, A27}$ at $f_1$, $A_{478}$ at $f_2$, $A_{24}$ at $f_3$, $A_{127}$ at $f_4$, ..., $A_Q$ at $f_n$, the table 340 indicates that the motor 30 has a bad bearing. As will be appreciated, the table 340 can store an enormous amount of vibration signatures corresponding to various health states of the motor 30, which the processor 200, for example, can employ to diagnose the health of the motor 30.

The processor 200 or processor of the host computer 110 may utilize various analytical techniques such as those which generally fall under the category of classical vibration analysis which have been proven to detect certain mechanical problems such as, for example, bearing failure, rotor problems, contamination from water or grit, holes in bearings, flat areas on bearings, broken or loose motor mounting, misalignment of motor shaft and load shaft, bent shafts, loose couplings, stator winding problems, fan problems, etc.

Similarly, other tables may be stored in the memory so that the processor can determine the state of the motor 30 with respect to the current signature data, motor temperature data, motor voltage data, motor shaft rotation data, etc.

Although the present invention has been described with respect to obtaining Fast Fourier Transforms of the current signals and vibration signals, it should be appreciated that other suitable techniques may be employed. For example, wavelet transforms may be taken of the various sensor data in connection with pattern classification via joint time frequency analysis. Since an original signal C<n> can be recovered from, for example, a polynomial sequence having coefficients C<0>, D<0>, D<1>, ..., D<n−1>, this sequence can be thought of as a transform of the original signal, and is known as a wavelet transform. One advantage to using the wavelet transform is that the total size of the transform C<0>, D<0>, ..., D<n−1> is a compact representation of the original signal and will require considerably less storage than the original signal.

Wavelet transforms have a number of properties that make them attractive for signal processing. For example, if filters are constructed to be sparse, then a filter bank operation can be performed very quickly. Also, for many of the signals encountered in practice, a large percentage of the entries in the wavelet transform are negligible. Wavelet compression methods can therefore approximate the original set of samples in C<n> by storing only the significant coefficients of the wavelet transform.

Wavelets have a variety of applications, for example, wavelets have been used in signal analysis, as discussed in Mallat, "A Theory for Multiresolution Signal Decomposition: The Wavelet Representation," IEEE transactions on Pattern Analysis and Machine Intelligence 11(7):674–693, July 1989. Wavelets have also been used in image processing and numerical analysis, as discussed in DeVore, Jawerth, and Lucier, "Image Compression Through Wavelet Transform Coding," IEEE Transactions on Information Theory 38(2):719–746, March 1992 and Beylkin, Coifman and Rokhlin, "Fast Wavelet Transforms and Numerical Algorithm I," Communications on Pure and Applied Mathematics 44:141–183, 1991, respectively. All of these references are hereby incorporated by reference in their entirety.

All that is required for performing a wavelet transform is an appropriate set of analysis and synthesis filters. By using the wavelet transform, a much smaller, compact, training set can be employed, which still enables the present invention to reconstruct the original signal information. One particular example of using the compact representation property of wavelets is to generate the wavelet transforms of raw sampled current and raw sampled vibration. Since wavelet coefficients are a compact representation of the original signal, these coefficients can be used directly to perform machinery diagnosis using joint time-frequency domain methods.

This approach also affords for a pseudo frequency domain and time domain analysis of the signal data. Wavelet coefficients thus may provide robust estimates of fractal dimension even in the presence of significant noise. Such an aspect of the present invention involves relative simplicity of implementation while affording great flexibility in accommodating a broad range of signal types and noise levels.

It is also to be appreciated that the present invention may optionally employ chaos theory. Chaos theory may be a useful tool to facilitate determining system defects and/or rotating machinery problems at early stages. Such techniques, well known in the art, have been shown to be effective indicators of the onset of mechanical instability (e.g., lube breakdown).

Figure 8A:
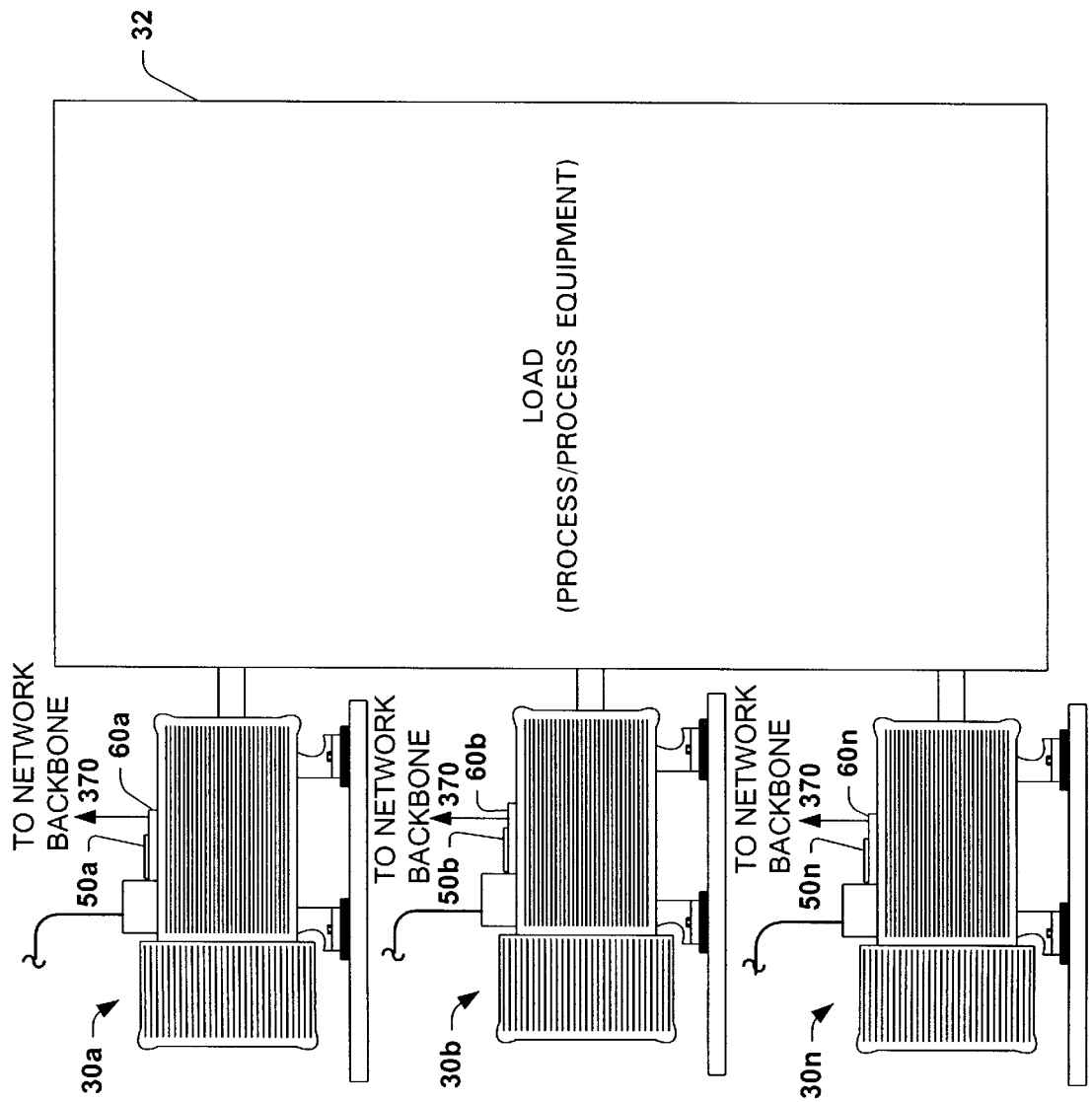
FIG. 8a is a schematic illustration of a load sharing system in accordance with the present invention.

Turning now to FIG. 8a, one specific application of the present invention is illustrated in connection with load sharing. A plurality of machines 30a, 30b ... 30n (wherein "n" is an integer) are shown sharing a common load 32. Each machine 30a, 30b, ... 30n has coupled thereto a respective docking station 60a, 60b, ... 60n. Coupled to each docking station 60a, 60b, ... 60n respectively are diagnostic modules 50a, 50b, ... 50n. The diagnostic modules 50a, 50b, ... 50n are operatively coupled to each other via a network 370 linking the docking stations 60a, 60b, ... 60n together. The link of the diagnostic modules 50a, 50b, ... 50n may provide for serial data transfer to single modules or multiple addressable modules. Any suitable communications link (e.g., Ethernet, Devicenet) may be employed to carry out the present invention. The diagnostic modules 50a, 50b, ... 50n communicate with each other in real time so as to provide for sharing of machine data corresponding to the load sharing between the two machines. It is also to be appreciated that the diagnostic modules 50a, 50b, ... 50n may be coupled to control processors (not shown) of the machines 30a, 30b, ... 30n wherein the diagnostic modules 50a, 50b, ... 50n may provide for coordination of the load sharing as well.

Figure 8B:
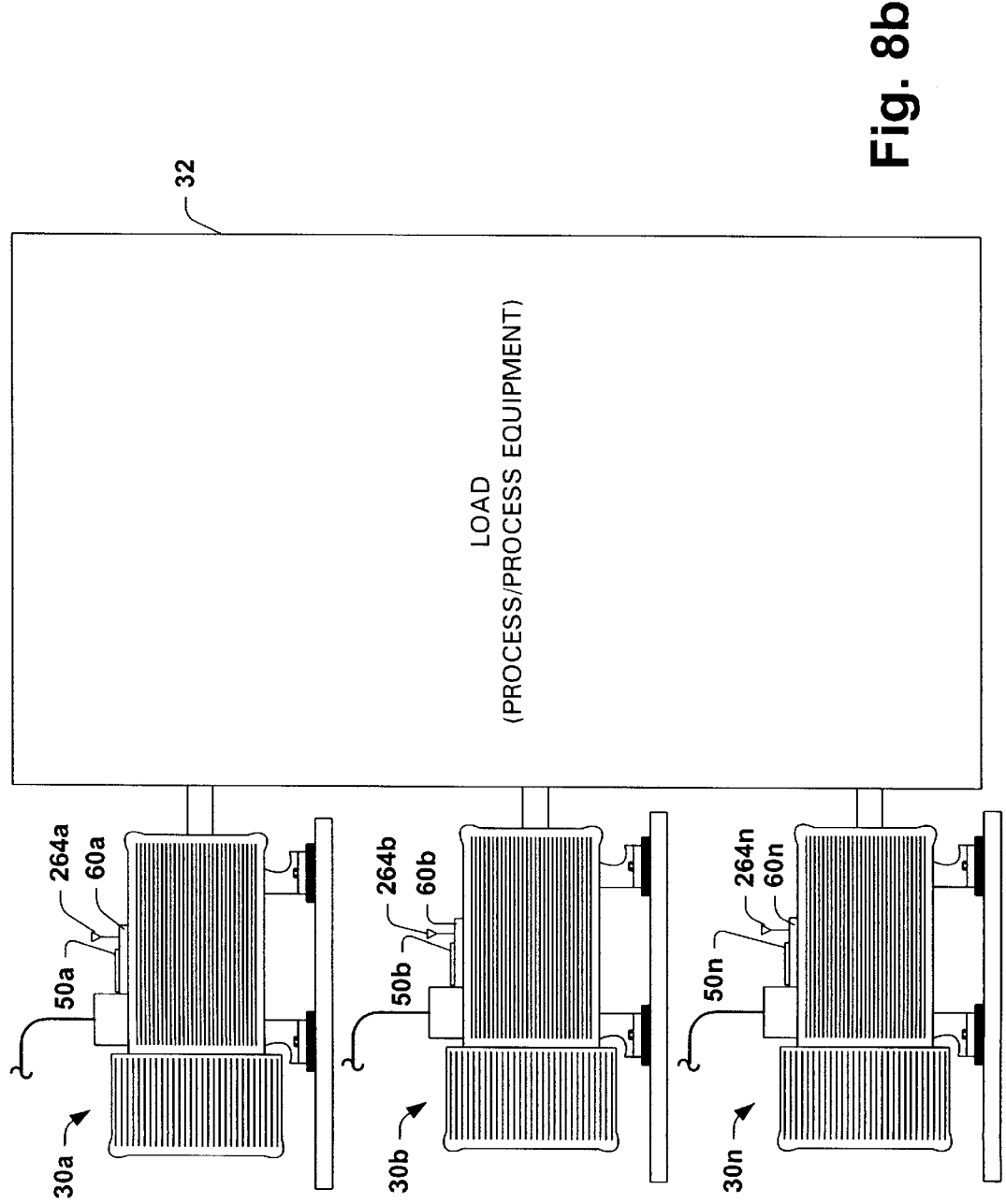
FIG. 8b is a schematic illustration of a load sharing system in accordance with the present invention.

FIG. 8b is another embodiment of the present invention wherein the modules 50a, 50b, ... 50n communicate wirelessly via antennas 264a, 264b, ... 264n rather than over a network.

Figure 9:
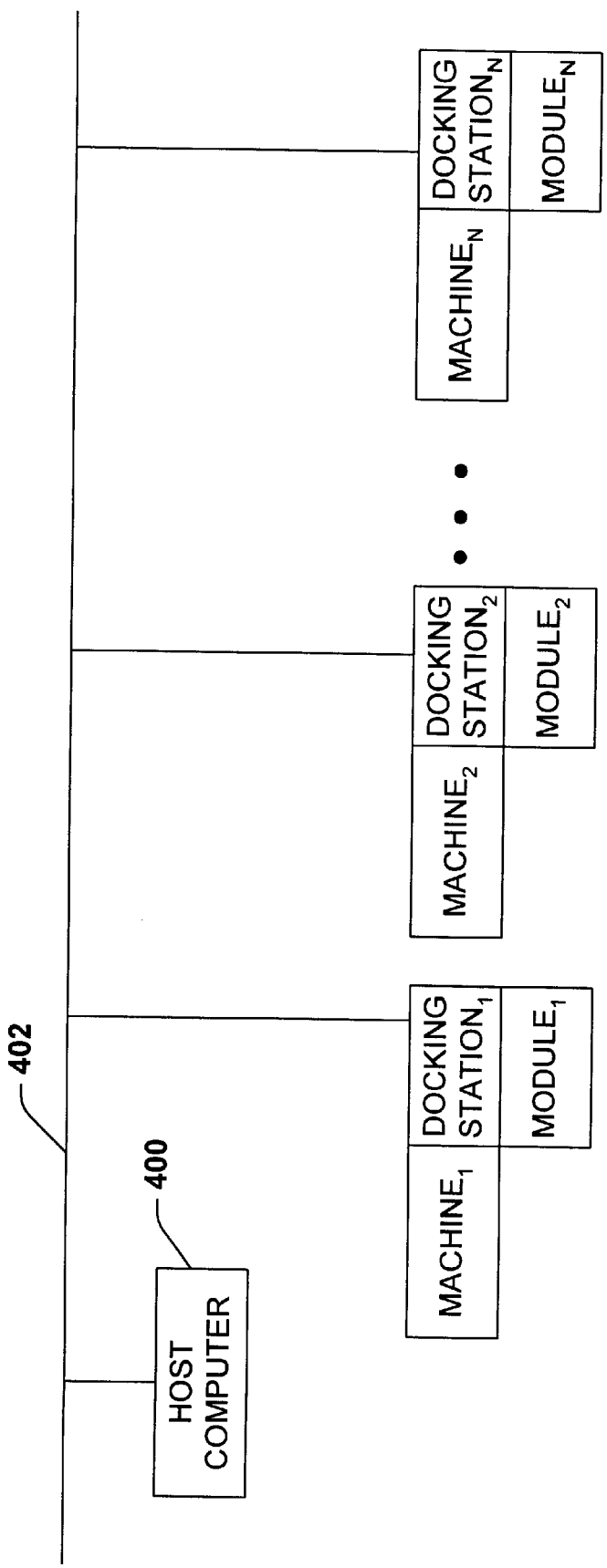
FIG. 9 is a schematic illustration of a system for collecting diagnostic data for a plurality of machines in accordance with the present invention.

FIG. 9 illustrates another embodiment of the present invention wherein a plurality of machines,N are each fitted with respective docking stations$_{n-N}$, and each docking station$_{1-N}$, is adapted to receive a respective diagnostic module$_{1-N}$. Each docking station is coupled to a host computer 400 via a network backbone 402. The host computer 400 may provide for controlling data collection by the respective diagnostic modules. The host computer 400 may also collect the machine data via the network 402. Since the diagnostic modules perform a substantial amount of processing of the raw machine data, network bandwidth requirements are minimized and available network capacity is efficiently utilized. Also, network availability is not critical to maintaining ongoing diagnostics and continuity of stored data. Individual diagnostic modules may collect raw data until the network is again re-established, and a suitable "store & forward" scheme initiated to re-synchronize data collection with the host computer 400.

Figure 10:
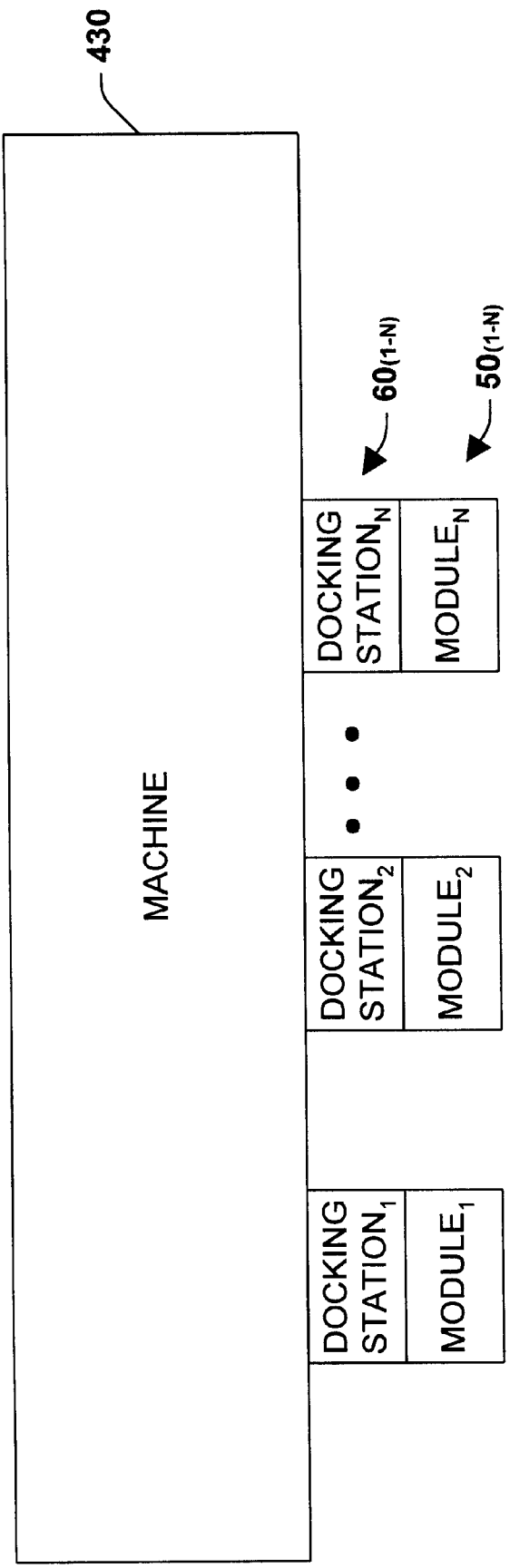
FIG. 10 is a schematic illustration of a system for collecting diagnostic data for a large machine in accordance with the present invention

FIG. 10 provides for another embodiment of the present invention wherein N number of docking stations $60_{(1-N)}$ are coupled to a single large machine 430. Each docking station 60 is adapted to couple to a corresponding diagnostic module $50_{(1-N)}$. Due to large size of some machines, a single docking station and diagnostic module may not be sufficient to collect enough relevant machine data in order to make an accurate health determination of the machine 430. Thus, by using a plurality of docking stations $60_{(1-N)}$ corresponding sensors can be positioned throughout the machine 430 with mitigating problems associated with introduction of noise because of too long a path between the sensor and docking station 60. This permits docking stations to be standardized for a given complement of sensors and algorithms.

It is also to be appreciated that in such an embodiment, a hierarchy between the respective diagnostic modules 50 may be implemented. For example, all of the diagnostic modules 50 may be operatively in communication with each other (e.g., wirelessly in the manner described above in other embodiments). One of the modules 50 may serve as a master and the other modules 50 as slaves. The master module 50 may provide for controlling and coordinating data collection and processing of the collected data so as to facilitate making an accurate health determination of the machine 430. The use of multiple diagnostic modules on a single machine enables the individual modules to confirm the health and correct operation of all other modules. This facility for self-assessment thus enables the system of modules to be dynamically reconfigured where operating module will assume data storage and and processing duties previously performed by failed modules or sensors.

Thus, the present invention provides for a system for collecting and processing machine data to facilitate determining a health state of the machine as well as trending performance of the machine.

It is to be appreciated that the present invention may be applied to a wide variety of machines (e.g., induction motors, DC motors, DC synchronous motors, AC synchronous motors, and motors driven via inverters, motors driven via SCR soft starts, pumps and gear boxes) and combinations thereof.

What has been described above are preferred embodiments of the present invention. It is, of course, not possible to describe every conceivable combination of components or methodologies for purposes of describing the present invention, but one of ordinary skill in the art will recognize that mainly further combinations and permutations of the present invention are possible. Accordingly, the present invention is intended to embrace all such alterations, modifications and variations that fall within the spirit and scope of the appended claims.

What is claimed is:

1. A dynamoelectric machine diagnostic system, comprising:

a docking station coupled to a dynamoelectric machine;

a plurality of sensors operatively coupled to the docking station, at least one of the sensors being positioned within the dynamoelectric machine for data gathering; and a diagnostic module, adapted to be received by and coupled to the docking station so that the diagnostic module may collect data output from at least one of the plurality of sensors.

2. The system of claim 1, the diagnostic module processing the collected data to facilitate rendering a health assessment of the dynamoelectric machine.

3. The system of claim 1, the diagnostic module generating an FFT of vibration data of the dynamoelectric machine.

4. The system of claim 1, the diagnostic module generating an FFT of current data of the dynamoelectric machine.

5. The system of claim 1, the diagnostic module determining shaft torque and shaft speed of the dynamoelectric machine.

6. The system of claim 1, the diagnostic module determining temperature of the dynamoelectric machine.

7. The system of claim 1, the plurality of sensors including an accelerometer positioned with the dynamoelectric machine.

8. The system of claim 1, the plurality of sensors including an encoder positioned within the dynamoelectric machine.

9. The system of claim 1, the plurality of sensors including an optical sensor positioned within the dynamoelectric machine.

10. The system of claim 1, the plurality of sensors including a current sensor positioned within the dynamoelectric machine.

11. The system of claim 1, the plurality of sensors including a viscosity sensor positioned within the dynamoelectric machine.

12. The system of claim 1, the plurality of sensors including a temperature sensor positioned within the dynamoelectric machine.

13. The system of claim 1, the plurality of sensors including an acoustic sensor positioned within the dynamoelectric machine.

14. The system of claim 1, the plurality of sensors including a flux sensor positioned within the dynamoelectric machine.

15. The system of claim 1, the diagnostic module including a neural network to facilitate processing of the collected data.

16. The system of claim 1, the diagnostic module including an expert system to facilitate processing of the collected data.

17. The system of claim 1, the diagnostic module including an RF section.

18. The system of claim 1, the docking station including an RF section.

19. The system of claim 1, the diagnostic module including a black-box recorder type housing.

20. The system of claim 1, the docking system including a memory, the memory storing design information specific to the dynamoelectric machine.

21. The system of claim 1, the diagnostic module including a memory, the memory storing design information specific to the dynamoelectric machine.

22. A system for load sharing by at least a first and second dynamoelectric machine, comprising:

a first diagnostic module operatively coupled to the first dynamoelectric machine;

a second diagnostic module operatively coupled to the second dynamoelectric machine, the second diagnostic module being operatively coupled to the first diagnostic module;

the first diagnostic module and second diagnostic module coordinating with each other a data collection protocol to collect machine data respectively from the first and second dynamoelectric machines.

23. The system of claim 22, the first diagnostic module and the second diagnostic module communicating via a network.

24. The system of claim 22, the first diagnostic module and the second diagnostic module communicating via a wireless link.

25. A system for diagnosing the health state of a plurality of dynamoelectric machines, comprising:

a host computer operatively coupled to a network backbone;

a plurality of docking stations, each docking station coupled to a respective dynamoelectric machine of the plurality of machines, each docking station operatively coupled to the host computer via the network, each docking station being operatively coupled to at least one machine data collecting sensor positioned within the respective machine; and a plurality of diagnostic modules, each diagnostic module adapted to be received by and coupled to a respective one of the plurality of docking stations, each diagnostic module collecting data from the respective at least one sensor, each diagnostic module processing the collected data to facilitate diagnosing the health state of the respective machine.

26. A system for determining a health state of a dynamoelectric machine, comprising:

a first docking station coupled to the machine, the first docking station being operatively coupled to a first data collecting sensor positioned in the machine;

a second docking station coupled to the machine, the second docking station being operatively coupled to a second data collecting sensor positioned in the machine;

a first diagnostic module adapted to be coupled to the first docking station, the first diagnostic module receiving data collected by the first sensor;

a second diagnostic module adapted to be coupled to the second docking station, the second diagnostic module receiving data collected by the second sensor, the second diagnostic module being operatively coupled to the first diagnostic module;

wherein the first diagnostic module controls the second diagnostic module.

27. The system of claim 26 the first diagnostic module storing the received data.

28. The system of claim 26 the second diagnostic module storing the received data.

29. The system of claim 26 the first diagnostic module processing the received data.

30. The system of claim 26 the second diagnostic module processing the received data.

31. A dynamoelectric machine diagnostic system, comprising:

a plurality of sensors for internally sensing a plurality of parameters of at least two dynamoelectric machines;

at least two collection means for collecting data related to the sensed parameters of the machines respectively, the at least two collection means coordinating with each other a data collection protocol to collect machine data respectively from the dynamoelectric machines;

coupling means for operatively coupling the plurality of sensors to the at least two collection means; and processing means for processing the collected data.

* * * * *